US012524010B2

(12) United States Patent
Nister et al.

(10) Patent No.: US 12,524,010 B2
(45) Date of Patent: Jan. 13, 2026

(54) CONTROLLING AUTONOMOUS VEHICLES USING SAFE ARRIVAL TIMES

(71) Applicant: NVIDIA Corporation, Santa Clara, CA (US)

(72) Inventors: David Nister, Bellevue, WA (US); Anton Vorontsov, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 18/464,621

(22) Filed: Sep. 11, 2023

(65) Prior Publication Data

US 2023/0418299 A1    Dec. 28, 2023

Related U.S. Application Data

(63) Continuation of application No. 16/269,921, filed on Feb. 7, 2019, now Pat. No. 11,789,449.

(Continued)

(51) Int. Cl.
*G05D 1/00* (2024.01)
*B60W 30/08* (2012.01)
*G06V 20/58* (2022.01)

(52) U.S. Cl.
CPC .......... *G05D 1/0214* (2013.01); *B60W 30/08* (2013.01); *G05D 1/0231* (2013.01); *G06V 20/58* (2022.01);
(Continued)

(58) Field of Classification Search
CPC .... G05D 1/021; G05D 1/0214; G05D 1/0231; G05D 1/0242; G05D 1/0246;
(Continued)

(56) References Cited

U.S. PATENT DOCUMENTS 9,555,781 B2    1/2017 Breuer et al.
10,268,191 B1*  4/2019 Lockwood .......... G05D 1/2279
(Continued)

FOREIGN PATENT DOCUMENTS

CN    101132965 A    2/2008
CN    101837782 A    9/2010
(Continued)

OTHER PUBLICATIONS

Nister, David; Decision on Rejection for Chinese Patent Application No. 201980004694.7, filed Mar. 24, 2020, mailed Dec. 15, 2023, 7 pgs.
(Continued)

*Primary Examiner* — Ig T An
(74) *Attorney, Agent, or Firm* — Iron Summit IP LLP

(57) ABSTRACT

In various examples, sensor data representative of a field of view of at least one sensor of a vehicle in an environment is received from the at least one sensor. Based at least in part on the sensor data, parameters of an object located in the environment are determined. Trajectories of the object are modeled toward target positions based at least in part on the parameters of the object. From the trajectories, safe time intervals (and/or safe arrival times) over which the vehicle occupying the plurality of target positions would not result in a collision with the object are computed. Based at least in part on the safe time intervals (and/or safe arrival times) and a position of the vehicle in the environment a trajectory for the vehicle may be generated and/or analyzed.

20 Claims, 16 Drawing Sheets

Related U.S. Application Data

(60) Provisional application No. 62/628,831, filed on Feb. 9, 2018.

(52) U.S. Cl.
CPC ........ *G06V 20/584* (2022.01); *B60R 2300/30* (2013.01); *G05D 1/0242* (2013.01); *G05D 1/0255* (2013.01); *G05D 1/0257* (2013.01)

(58) Field of Classification Search
CPC .. G05D 1/0255; G05D 1/0257; G05D 1/0268; B60R 1/00; B60R 2300/30; B60W 30/08; G06K 9/00805; G06K 9/00825; G06K 9/00832

See application file for complete search history.

(56) References Cited

U.S. PATENT DOCUMENTS

| | | | |
|---|---|---|---|
| 10,885,698 | B2 | 1/2021 | Muthler et al. |
| 11,079,764 | B2 | 8/2021 | Nister et al. |
| 11,789,449 | B2 | 10/2023 | Nister et al. |
| 2004/0246114 | A1 | 12/2004 | Hahn |
| 2009/0012703 | A1* | 1/2009 | Aso ............... G05D 1/0214 701/532 |
| 2009/0093960 | A1* | 4/2009 | Puhalla ........... B60W 30/09 701/301 |
| 2010/0324771 | A1* | 12/2010 | Yabushita ......... G05D 1/0246 701/25 |
| 2011/0246156 | A1 | 10/2011 | Zecha et al. |
| 2012/0101711 | A1 | 4/2012 | Furmstom et al. |
| 2015/0246678 | A1* | 9/2015 | Hauler ............ B62D 1/28 701/25 |
| 2016/0321074 | A1 | 11/2016 | Hung et al. |
| 2016/0362118 | A1 | 12/2016 | Mollicone et al. |
| 2018/0121273 | A1 | 5/2018 | Fortino et al. |
| 2019/0146515 | A1* | 5/2019 | De Salvo ........ G08G 1/166 701/23 |
| 2021/0354729 | A1 | 11/2021 | Ng et al. |
| 2025/0178595 | A1 | 6/2025 | Nister et al. |

FOREIGN PATENT DOCUMENTS

| | | |
|---|---|---|
| CN | 104937512 A | 9/2015 |
| WO | 2017079349 A1 | 5/2017 |

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.
ISO 26262, "Road vehicle—Functional safety," International standard for functional safety of electronic system, https://en.wikipedia.org/wiki/ISO_26262, accessed on Sep. 13, 2021, 8 pgs.
Nister, David; Non-Final Office Action for U.S. Appl. No. 16/269,921, filed Feb. 7, 2019, mailed Oct. 19, 2022, 13 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
"System and Method for Controlling Autonomous Vehicles", U.S. Appl. No. 62/614,466, filed Jan. 17, 2018.
"System and Method for Safe Operation of Autonomous Vehicles", U.S. Appl. No. 62/625,351, filed Feb. 2, 2018.
"Systems and Methods for Safe and Reliable Autonomous Vehicles", U.S. Appl. No. 62/584,549, filed Nov. 10, 2017.
Ching Y. Hung et al. "Programmable Vision Accelerator", U.S. Appl. No. 62/156,167, filed May 1, 2015.
Nister, David, Final Office Action for U.S. Appl. No. 16/269,921, filed Feb. 7, 2019, mailed Feb. 1, 2023, 16 pgs.
"Programmable Vision Accelerator", U.S. Appl. No. 15/141,703, filed Apr. 28, 2016.
"Reliability Enhancement Systems and Methods" U.S. Appl. No. 15/338,247, filed Oct. 28, 2016.
"Methodology of Using a Single Controller (ECU) for a Fault-Tolerant/Fail-Operational Self-Driving System", U.S. Appl. No. 62/524,283, filed Jun. 23, 2017.
Nister, David; Notice of Allowance for U.S. Appl. No. 16/269,921, filed Feb. 7, 2019, mailed Jun. 7, 2023, 14 pgs.
Nister, et al.; First Office Action for Chinese Patent application No. 201980004694.7, filed Mar. 24, 2020, mailed Jun. 29, 2023, 12 pgs. English Abstract Included.
Nister, David; Invitation to Pay Additional Fees for PCT Application No. PCT/US2019/017072, filed Feb. 7, 2019, mailed May 15, 2019, 58 pgs.
Nister, David; International Preliminary Report on Patentability for PCT Application No. PCT/US2019/017072, filed Feb. 7, 2019, mailed Aug. 20, 2020, 12 pgs.
Nister, David; International Search Report and Written Opinion for PCT Application No. PCT/US2019/017072, filed Feb. 7, 2019, mailed Jul. 18, 2019, 16 pgs.
Nister, David: Phillips, et al.; "SIPP: Safe Interval Path Planning for Dynamic Environments," In 2011 IEEE International Conference on Robotics and Automation, May 2011, 8 pgs.

\* cited by examiner

CONTROLLING AUTONOMOUS VEHICLES USING SAFE ARRIVAL TIMES

CROSS-REFERENCE TO RELATED APPLICATIONS

This application is a Continuation of U.S. patent application Ser. No. 16/269,921, filed Feb. 7, 2019, which claims the benefit of U.S. Provisional Application No. 62/628,831, filed on Feb. 9, 2018. Each of which is hereby incorporated by reference in its entirety.

BACKGROUND

To operate safely, autonomous vehicles should be capable of traversing a path through an environment without colliding with other objects (e.g., vehicles, people, trees, animals, buildings, etc.). In order to accomplish this, autonomous vehicles should account for the other objects when planning paths through the environment. Conventional approaches to planning a path for an autonomous vehicle include generating a heat map around the autonomous vehicle for a given time in the environment, and planning a path for the vehicle using the heat map. To generate the heat map, locations of other objects may be determined and probabilities of the vehicle colliding with the other objects at particular locations may be determined based at least in part on the object locations. The probabilities may be represented by the heat map and may factor in other information such as uncertainty of object locations.

However, the conventional approaches described above do not account for potential changes in the motion or state of objects in the environment (e.g., speed, velocity, acceleration, etc.) at point(s) along the path. As a result, a path generated for an autonomous vehicle using these conventional approaches may not fully account for possible collisions between the vehicle and the objects. This may present several challenges that may make systems that rely on these approaches unsafe. For example, using these conventional approaches, a path may quickly become less safe the longer it is followed, which may require a system to use short paths, and to update or generate the short paths frequently. Thus, systems that rely on these conventional approaches may not exhibit enough foresight to make the systems as informed as desired for fully autonomous driving. In addition, because the paths may need to be updated and/or generated so frequently, significant computing resources may be required. For example, large amounts of processing power, energy, and bandwidth may be required to update and/or generate the paths at a rate that enables safe and effective operation of autonomous vehicles.

SUMMARY

Embodiments of the present disclosure relate to controlling vehicles (e.g., autonomous vehicles) using safe arrival times. In contrast to conventional approaches, such as those described above, the current system accounts for potential changes in the motion and/or state of objects in an environment (e.g., speed, velocity, orientation, acceleration, etc.) when generating a path for a vehicle to follow, or analyzing the safety of a proposed path. Disclosed approaches may allow for the planning and testing of trajectories for vehicles in the time-space domain while accounting for potential changes to the motion of objects in the environment. As a result, there may be a strong assurance that a vehicle will not collide with objects in the environment at any point along a trajectory for the vehicle. Thus, compared to conventional approaches, the system may use longer paths, update or generate the paths less frequently, and/or may ultimately generate safer paths for autonomous vehicles.

In some examples, sensor data representative of a field of view of at least one sensor in an environment may be used to determine parameters of an object(s) located in the environment. From the trajectories, safe time intervals over which the vehicle occupying target positions would not result in a collision with the object may be computed. In some embodiments, an image is generated that has data values (e.g., color values) that are representative of safe time intervals (e.g., of safe arrival times of the safe time intervals). The image may be analyzed (e.g., using a GPU(s)) to generate a trajectory through the environment where the vehicle is unlikely to collide with another object and/or to test whether a proposed trajectory or path for the vehicle is unlikely to result in a collision with another object. In other embodiments, safe time intervals and trajectories may be computed directly from positional data of objects in the environment without generating an image or other graphical representation. In further embodiments, a graphical visualization that includes data representing one or more contours—such as, without limitation, a contour map—may be generated that is representative of the target positions and the corresponding safe time intervals and/or safe arrival times within the safe time intervals. Using the contour data, a trajectory for the vehicle may be generated and/or analyzed to provide a strong assurance that the vehicle will not collide with objects at any point when the vehicle follows the trajectory. In some examples, the contour data or image is rendered as a visualization displayed on a display device, such as on a Human Machine Interface (HMI) display and/or a dashboard of the vehicle.

BRIEF DESCRIPTION OF THE DRAWINGS

The present systems and methods for controlling autonomous vehicles using safe arrival times is described in detail below with reference to the attached drawing figures, wherein.

DETAILED DESCRIPTION

Figure 1A:
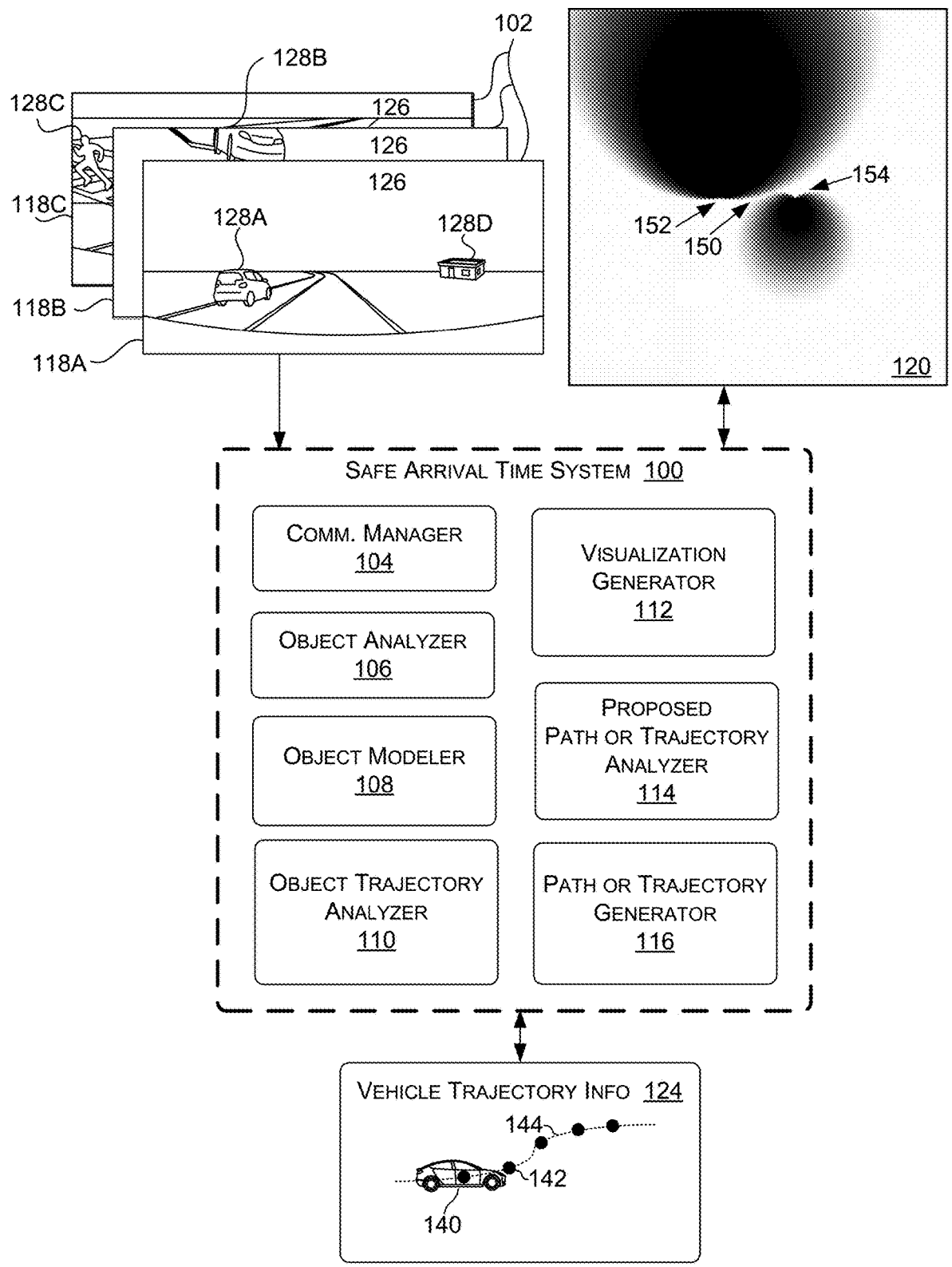
FIG. 1A is an illustration including an example safe arrival time system, in accordance with some embodiments of the present disclosure.

Systems and methods are disclosed related to controlling autonomous vehicles using safe arrival times. The present disclosure may be described with respect to an example autonomous vehicle 140 (alternatively referred to herein as "vehicle 140" or "autonomous vehicle 140"), an example of which is described in more detail herein with respect to FIGS. 12A-12D. Although the present disclosure primarily provides examples using autonomous vehicles, other types of objects may be controlled using safe arrival times. In addition, safe arrival times, safe time intervals, and visualizations described herein may be used for purposes other than controlling autonomous vehicles. For example, a visualization may be displayed on an HMI display and/or a dashboard (e.g., of the vehicle) without being used to control an autonomous vehicle.

When path planning, conventional systems may generate a heat map around an autonomous vehicle for a given time in an environment and plan a path for the vehicle using the heat map. To do so, locations of other objects may be determined and probabilities of the vehicle colliding with the other objects at particular locations may be determined based on the object locations. The probabilities may be represented by the heat map and may factor in other information such as uncertainty in object locations. However, these conventional approaches do not account for changes in the motion of objects in the environment (e.g., speed, velocity, acceleration, etc.) at some point along the path, thereby not fully accounting for possible collisions between the vehicle and the objects.

In contrast, disclosed approaches allow for the planning and testing of paths in a time-space domain while accounting for potential changes to the motion of objects in the environment. As a result of the approaches described herein, there may be a stronger assurance that a vehicle will avoid collisions (e.g., which, as used herein, may include actual contact or coming within a distance to an object without actual contact) with objects in the environment at any point along a path for the vehicle.

Compared to conventional approaches, the system described herein may use longer paths, update or generate the paths less frequently, and/or use safer paths for autonomous vehicles. For example, conventional approaches may generally capture how likely it would be for a vehicle to collide with an object if the vehicle were at particular positions in the environment under present conditions. In contrast, approaches described herein may be used to extrapolate present conditions using one or more future scenarios (e.g., a worst case scenario) in order to precisely define particular times at which it would be safe or otherwise desirable for the vehicle to arrive at those positions. These positions and times may form time-valued gradients (similar to potential fields) around objects which capture the relationship between the positions and precise times when it is determined to be safe or otherwise desirable for a vehicle to arrive at those positions.

In some examples, sensor data representative of a field of view of at least one sensor in an environment may be used to determine parameters of an object(s) located in the environment. Non-limiting examples of the parameters include a location, a pose, a velocity, a dimension, an acceleration, a mass, a class of the object (e.g., truck, person, sedan, etc.), or a type of the object (e g, make and/or model). Using the parameters of the object, trajectories of the object toward target positions in the environment may be modeled under one or more scenarios. For example, each trajectory may model a scenario in which the object heads directly toward a given target position, a reaction time after which the object begins to decelerate (e.g., once the object recognizes the vehicle), and/or a time at which the object comes to a complete stop (e.g., without hitting or contacting the vehicle).

From the trajectories, safe time intervals over which the vehicle occupying the target positions would not result in a collision with the object may be computed. For example, a safe time interval for each target position may start at a given time and end at the time the object comes to a complete stop, if any, prior to colliding with the vehicle. Using the safe time intervals and a position of the vehicle in the environment, a trajectory for the vehicle may be generated and/or analyzed to provide a strong assurance that the vehicle will avoid colliding with objects at any point if the vehicle follows the trajectory. For example, the trajectory may be generated or analyzed to ensure that the vehicle will arrive at each of the target positions within the corresponding safe time intervals over which the vehicle occupying the target positions would not result in a collision.

In some examples, an image is generated that has data values (e.g., color values) that are representative of at least portions of safe time intervals over which a vehicle occupying target positions would not result in a collision. For example, each data value (e.g., a pixel value) may represent a safe time interval, or one or more safe arrival times within the safe time interval, and one or more corresponding target positions. The image may be analyzed (e.g., using a GPU(s)) to generate a trajectory through the environment where the vehicle is unlikely to collide with another object and/or to test whether a proposed trajectory or path for the vehicle is unlikely to result in a collision with another object. For example, the data values may be representative of particular safe arrival times within the safe time intervals for particular target positions in the environment. According to other embodiments, safe time intervals and/or trajectories may be generated using positional data computed using sensor data (e.g., LIDAR information), without generating an image or reference to data or pixel values. The trajectory for the vehicle may be plotted in the time domain and the space domain to ensure all planned or proposed arrival times of the vehicle in the trajectory to the target positions will be prior to the particular times, thereby providing a strong assurance that the vehicle will not collide with objects in the environment at any point if the vehicle follows the trajectory.

In any example, a graphical representation that includes data for one or more contours (such as in a contour map) may be generated and/or determined that is representative of the target positions and the corresponding safe time intervals and/or safe arrival times within the safe time intervals. For example, each contour may correspond to a group of the target positions and a given safe arrival time for the vehicle. In examples that use data values (e.g., of an image) to represent the contour map, the data values may have a same value for target positions that have a same safe arrival time (and/or safe time interval). Using the contour data and a position of a vehicle in the environment, a trajectory for the vehicle may be generated and/or analyzed to provide a strong assurance that the vehicle will not collide with objects at any point if the vehicle follows the trajectory. For example, this may include generating and/or analyzing the trajectory to ensure that the vehicle will not intersect with any of the contours at the corresponding planned or proposed arrival times of the vehicle in the trajectory. In some examples, the contour map is displayed as a visualization, such as on an HMI display and/or a dashboard of the vehicle.

Now referring to FIG. 1A, FIG. 1A shows an illustration including an example safe arrival time system 100, in accordance with some embodiments of the present disclosure. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The safe arrival time system 100 may receive sensor data 102, representative of an environment 126, and use the sensor data 102 to compute at least one safe arrival time for an autonomous vehicle, such as a vehicle 140, to at least one position in the environment 126. In some examples, the at least one safe arrival time may be used to generate vehicle trajectory information 124 (e.g., data representative of a trajectory 144) for the autonomous vehicle and/or to analyze the vehicle trajectory information 124 representative of a proposed trajectory or path 144 for the autonomous vehicle. The at least one safe arrival time may be captured in safe arrival time data 120, comprising an image in the example shown. However, the at least one safe arrival time may be captured in a different form without departing from the scope of the present disclosure.

In one or more embodiments, the safe arrival time system 100 includes, for example, a communications manager 104, an object analyzer 106, an object modeler 108, an object trajectory analyzer 110, a visualization generator 112, a proposed path or trajectory analyzer 114, and a path or trajectory generator 116.

As an overview, the communications manager 104 may be configured to manage communications received by the safe arrival time system 100 (e.g., comprising the sensor data 102 and/or the vehicle trajectory information 124) and/or provided by the safe arrival time system 100 (e.g., comprising the safe arrival time data 120 and/or the vehicle trajectory information 124). The object analyzer 106 may be configured to analyze objects in the environment using the sensor data 102. The object modeler 108 may be configured to model objects, such as trajectories of the objects in the environment 126 based at least in part on the analysis performed by the object analyzer 106. The object trajectory analyzer 110 may be configured to analyze trajectories of objects, such as trajectories modeled by the object modeler 108 to compute the safe arrival times for the vehicle 140. The visualization generator 112 may generate at least one visualization based at least in part on the safe arrival times, such as the image represented by the safe arrival time data 120. The proposed path or trajectory analyzer 114 may be configured to analyze a proposed trajectory or path (e.g., represented by the vehicle trajectory information 124) using the safe arrival time data 120 (e.g., the image represented by the safe arrival time data 120). The path or trajectory generator 116 may be configured to generate a trajectory (e.g., represented by the vehicle trajectory information 124) using the safe arrival time data 120 (e.g., the image represented by the safe arrival time data 120).

Figure 1B:
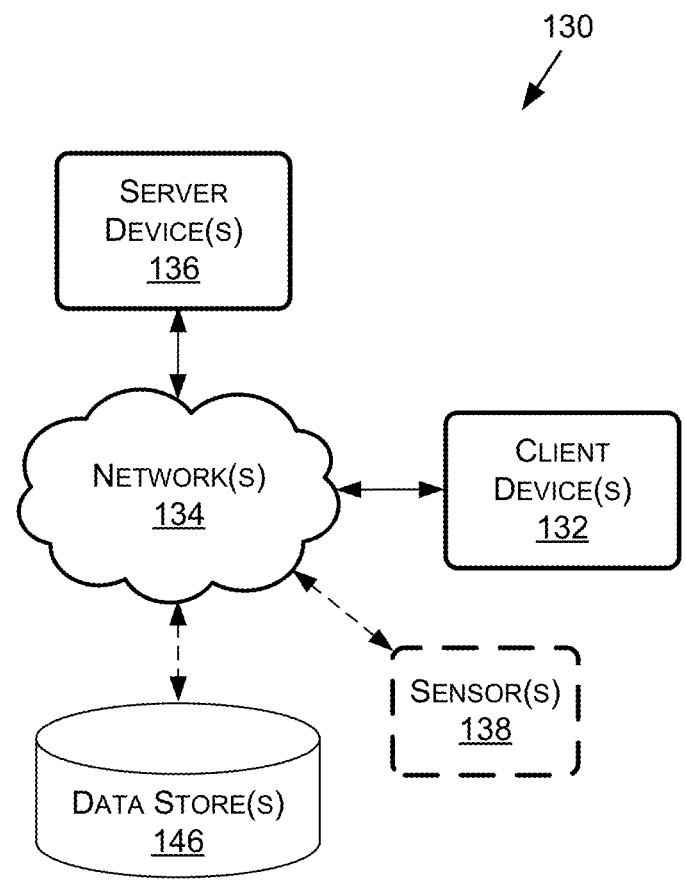
FIG. 1B is an illustration of an example operating environment for a safe arrival time system, in accordance with some embodiments of the present disclosure.

The safe arrival time system 100 may be implemented in an example operating environment 130 of FIG. 1B, in accordance with some embodiments of the present disclosure. Among other components not illustrated, the operating environment 130 includes a client device(s) 132, a network(s) 134, a server device(s) 136, a sensor(s) 138, and a data store(s) 146. It should be understood that operating environment 130 shown in FIG. 1B is an example of one suitable operating environment. Each of the components shown in FIG. 1B may be implemented via any type of computing device, such as one or more of computing device 1300 described in connection with FIG. 13, for example. These components may communicate with each other via the network 134, which may be wired, wireless, or both. The network 134 may include multiple networks, or a network of networks, but is shown in simple form so as not to obscure aspects of the present disclosure. By way of example, the network 134 may include one or more wide area networks (WANs), one or more local area networks (LANs), one or more public networks such as the Internet, and/or one or more private networks. Where the network 134 includes a wireless telecommunications network, components such as a base station, a communications tower, or even access points (as well as other components) may provide wireless connectivity. In any example, at least one network 134 may correspond to the network(s) 1290 of FIG. 12D, described further below.

It should be understood that any number of the client devices 132, the server devices 136, the sensors 138, and the data stores 146 may be employed within the operating environment 130 within the scope of the present disclosure. Each may be configured as a single device or multiple devices cooperating in a distributed environment.

Figure 12A:
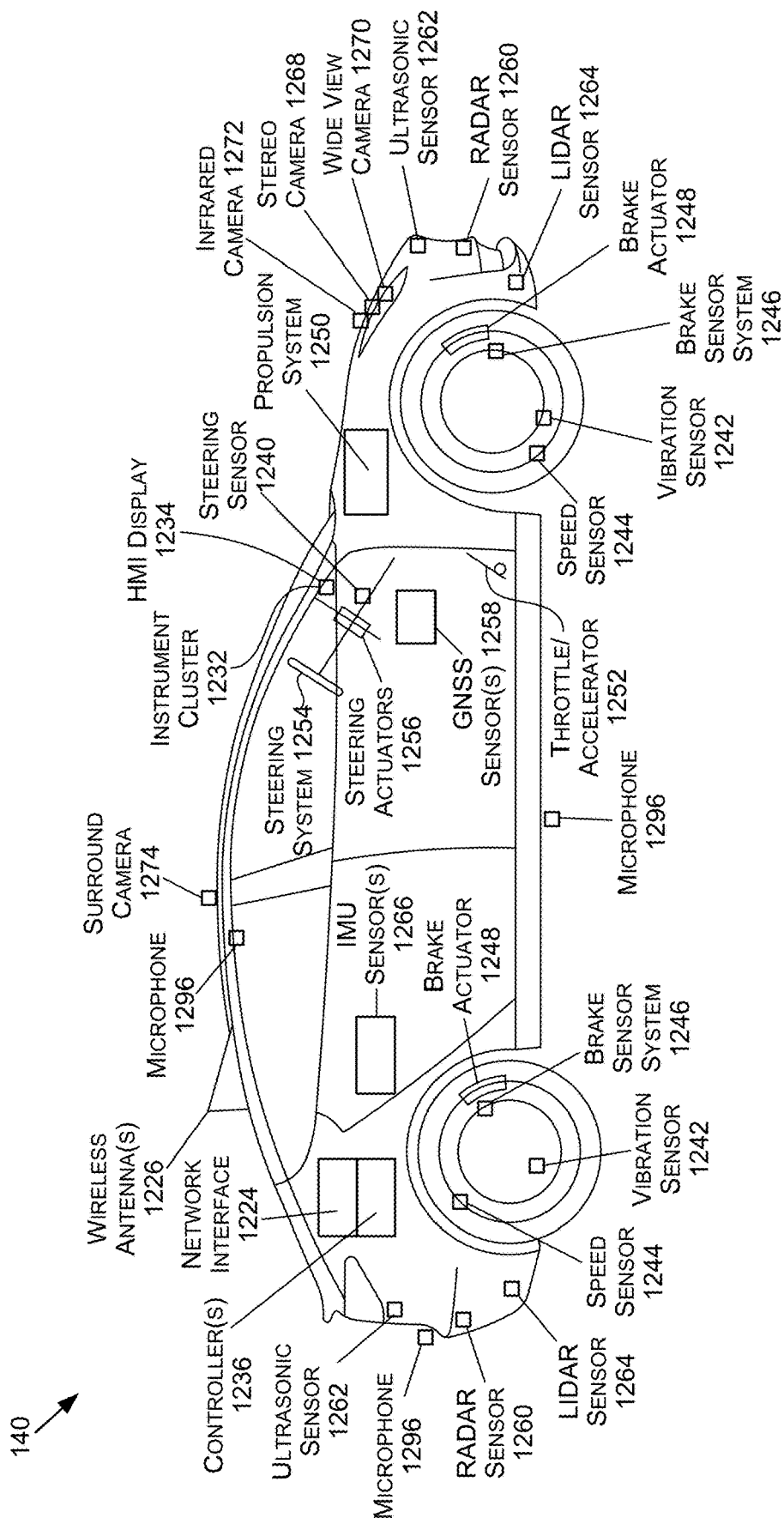
FIG. 12A is an illustration of an example autonomous vehicle, in accordance with some embodiments of the present disclosure.
Figure 12B:
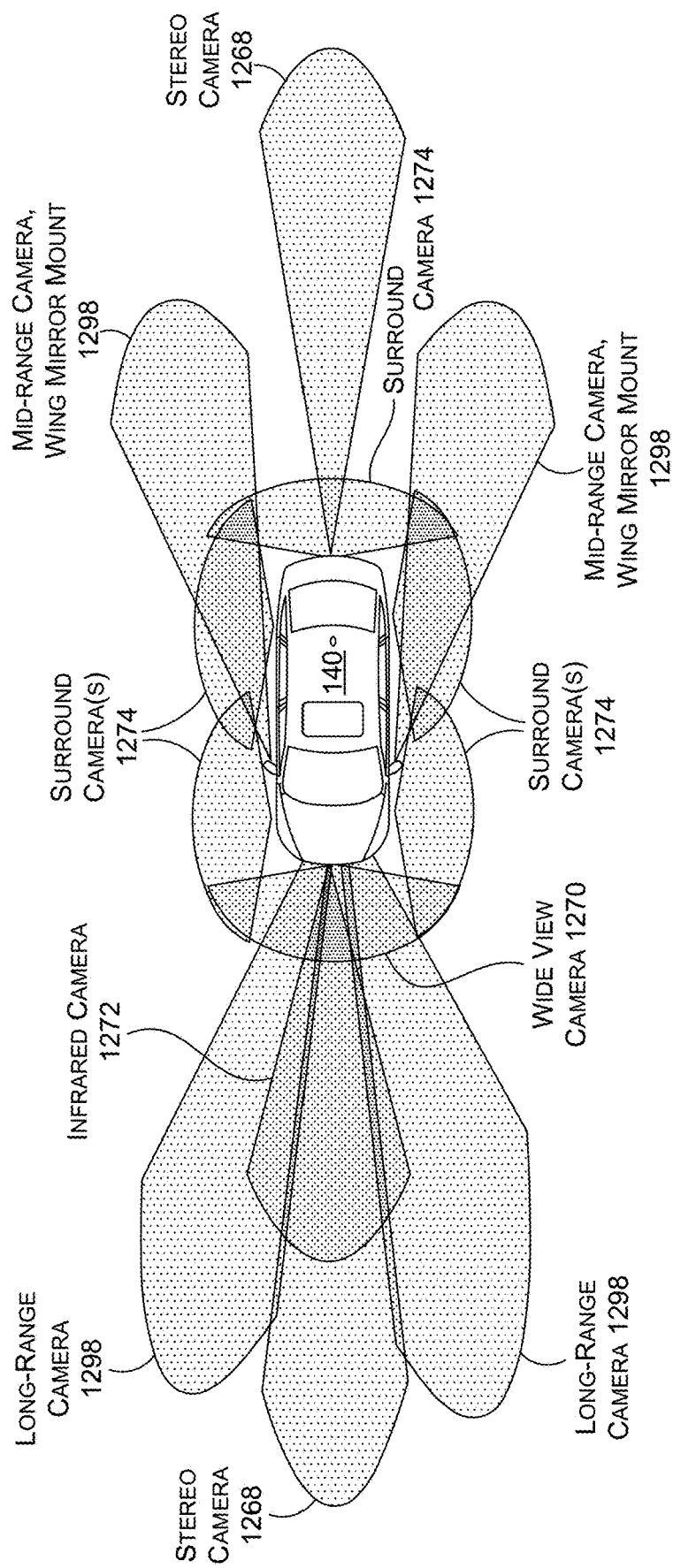
FIG. 12B is an example of camera locations and fields of view for the example autonomous vehicle of FIG. 12A, in accordance with some embodiments of the present disclosure.
Figure 12C:
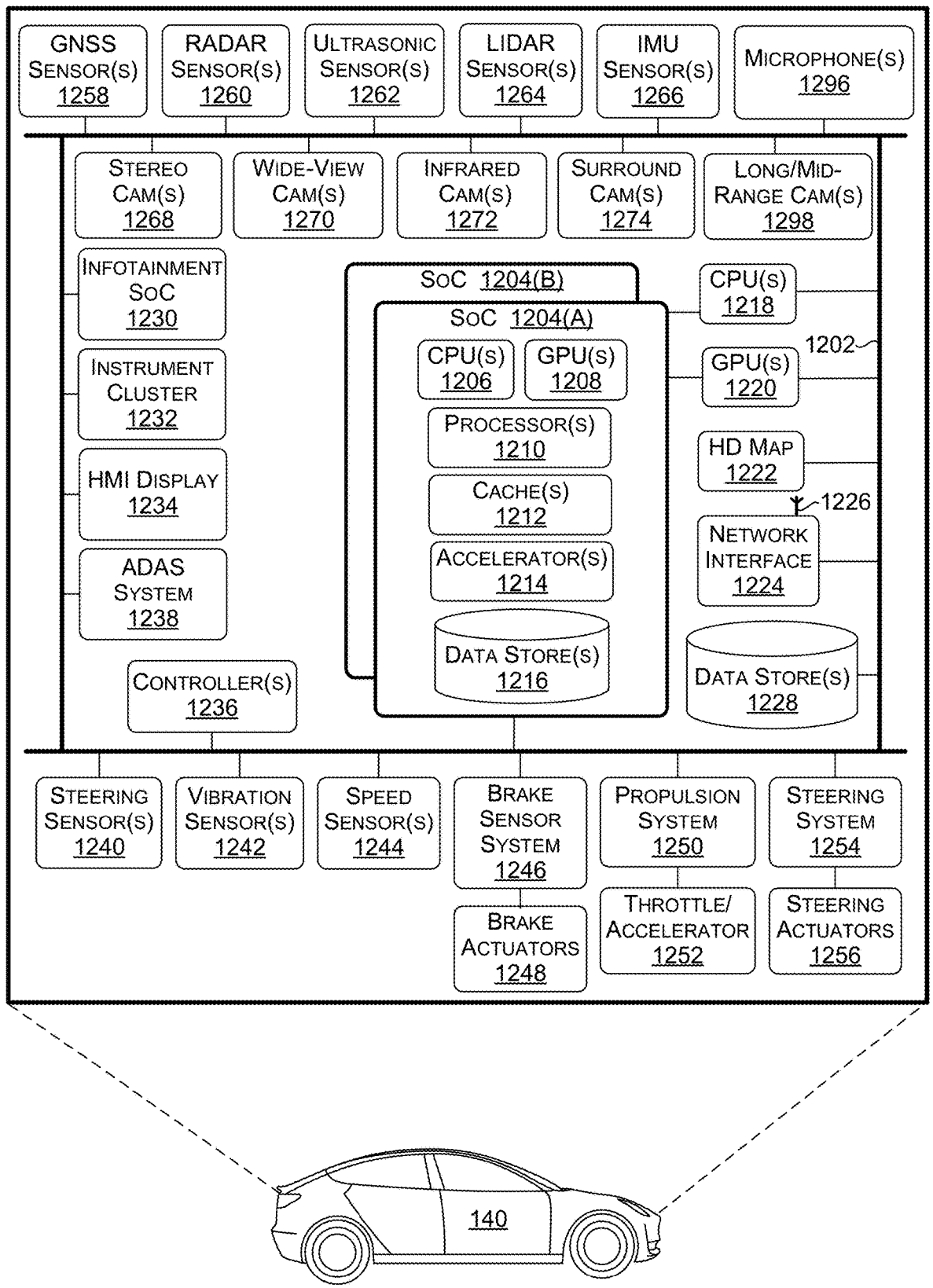
FIG. 12C is a block diagram of an example system architecture for the example autonomous vehicle of FIG. 12A, in accordance with some embodiments of the present disclosure.
Figure 12D:
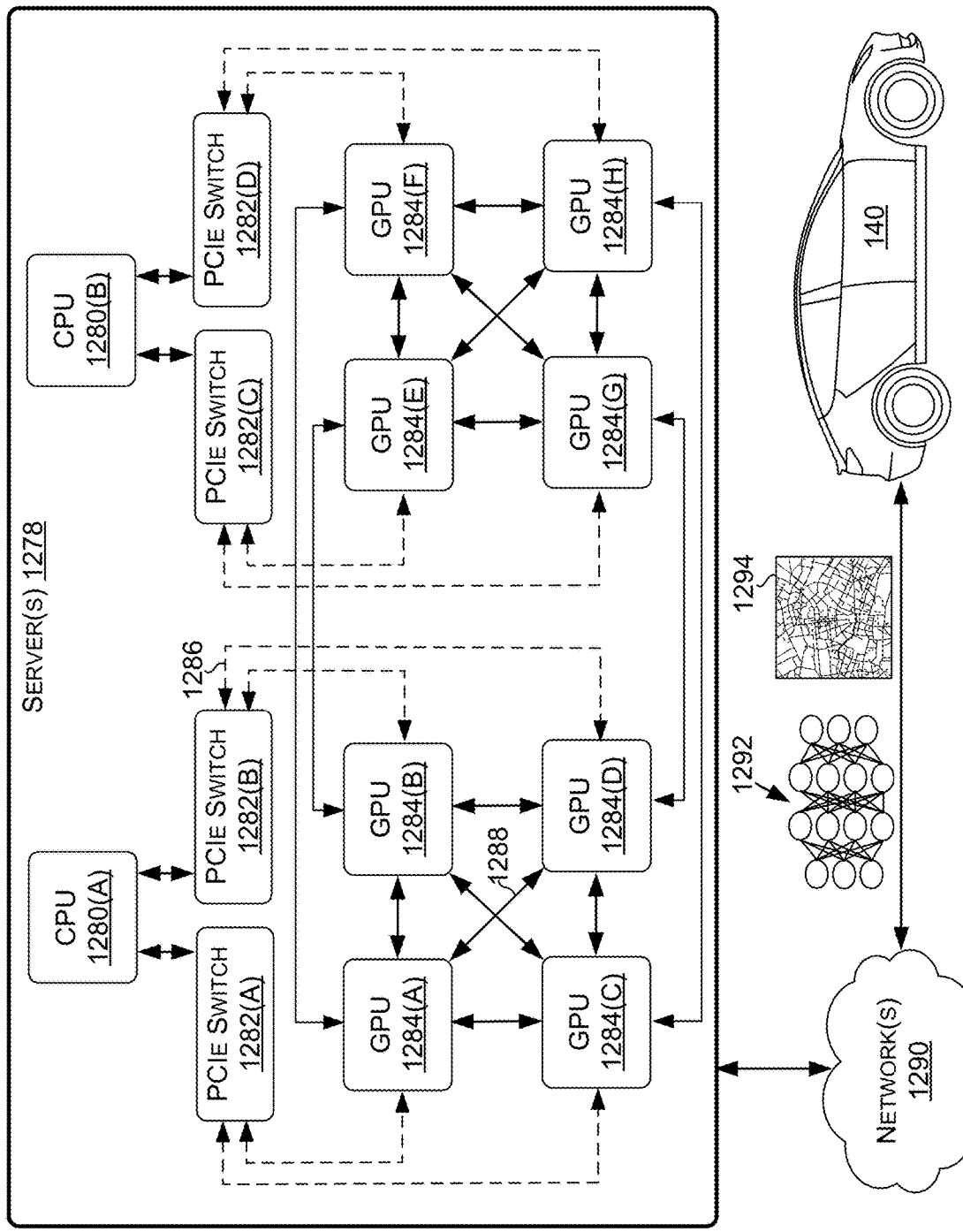
FIG. 12D is a system diagram for communication between cloud-based server(s) and the example autonomous vehicle of FIG. 12A, in accordance with some embodiments of the present disclosure.
Figure 13:
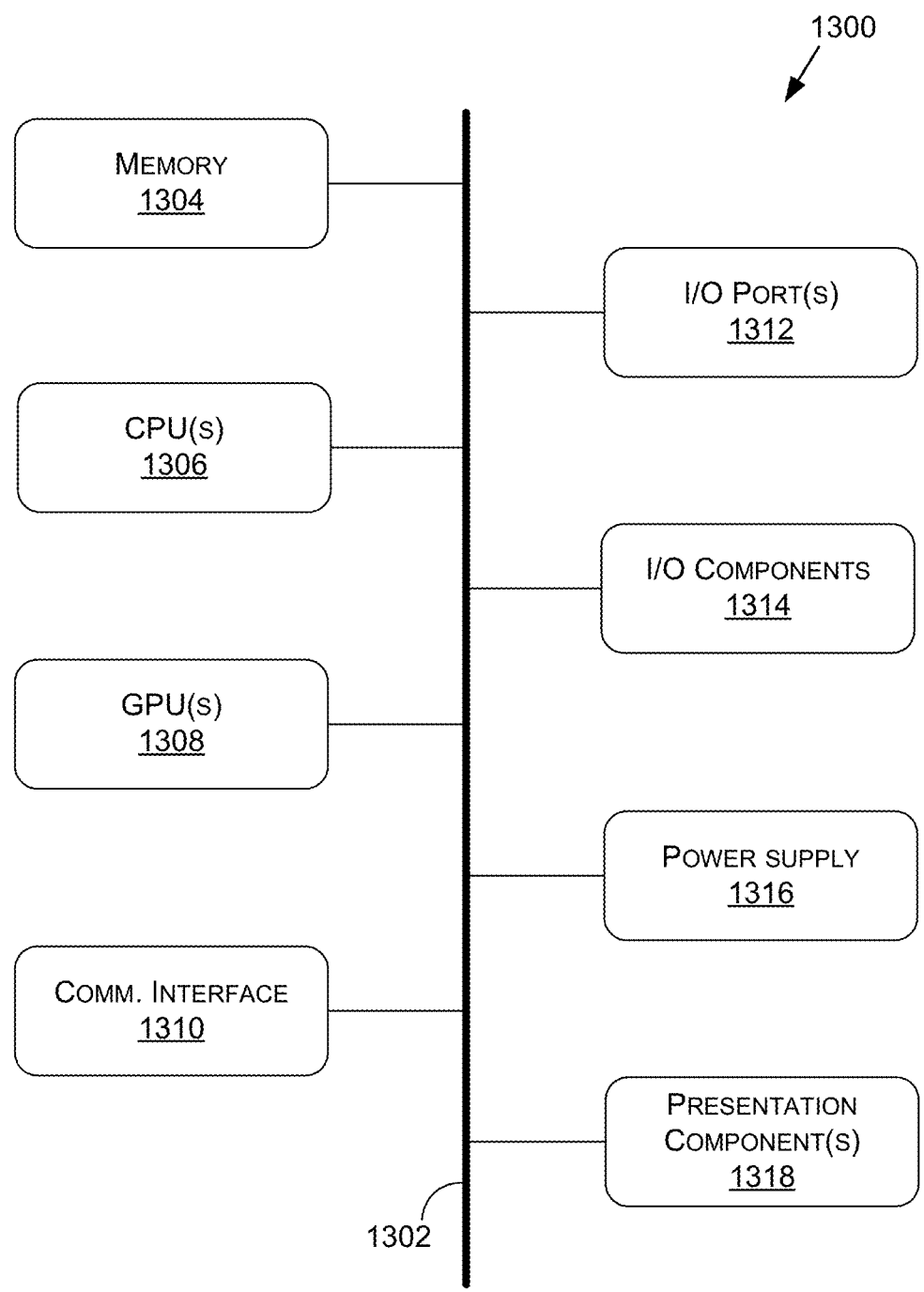
FIG. 13 is a block diagram of an example computing device suitable for use in implementing some embodiments of the present disclosure.

The client device(s) 132 may include at least some of the components, features, and functionality of the example computing device 1300 described herein with respect to FIG. 13. By way of example and not limitation, a client device 132 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. In any example, at least one client device 132 may be part of a vehicle, such as the vehicle 140 of FIGS. 12A-12D, described in further detail herein.

The client device(s) 132 may include one or more processors, and one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the safe arrival time system 100 of FIG. 1A.

The server device(s) 136 may also include one or more processors, and one or more computer-readable media. The computer-readable media includes computer-readable instructions executable by the one or more processors. The instructions may, when executed by the one or more processors, cause the one or more processors to perform any combination and/or portion of the methods described herein and/or implement any portion of the functionality of the safe arrival time system 100 of FIG. 1A. In any example, at least one server device 136 may correspond to the server(s) 1278 of FIG. 12D, described in further detail herein.

The data store(s) 146 may comprise one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the safe arrival time system 100 of FIG. 1A. The data store(s) 146 (or computer data storage) is depicted as a single component, but may be embodied as one or more data stores (e.g., databases) and may be at least partially in the cloud. One or more of the data store(s) 146 may correspond to one or more of the data stores of FIG. 12C.

Although depicted external to the server device(s) 136 and the client device(s) 132, the data store(s) 146 may be at least partially embodied on any combination of the server device(s) 136 and/or the client device(s) 132 (e.g., as memory 1304 (FIG. 13)). For example, some information may be stored on a client device(s) 132, and other and/or duplicate information may be stored externally (e.g., on a server device(s) 136). Thus, it should be appreciated that information in the data store(s) 146 may be distributed in any suitable manner across one or more data stores for storage (which may be hosted externally). For example, the data store(s) 146 may comprise at least some of the one or more computer-readable media of the server device(s) 136 and/or at least some of the one or more computer-readable media of the client device(s) 132.

The sensor(s) 138 comprise at least one sensor capable of generating sensor data representative of at least some aspect of an environment. For example, the sensor(s) 138 may generate the sensor data 102 of FIG. 1A. The sensor(s) 138 may comprise any combination of a global navigation satellite systems (GNSS) sensor(s) (e.g., Global Positioning System (GPS) sensor(s)), RADAR sensor(s), ultrasonic sensor(s), LIDAR sensor(s), inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), infrared camera(s), surround camera(s) (e.g., 360 degree cameras), long-range and/or mid-range camera(s), speed sensor(s) (e.g., for measuring the speed of the vehicle 140), vibration sensor(s), steering sensor(s), brake sensor(s) (e.g., as part of the brake sensor system), and/or other sensor types.

With reference to FIGS. 12A-12C, the sensor data 102 may be generated by, for example and without limitation, global navigation satellite systems (GNSS) sensor(s) 1268 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 140), vibration sensor(s) 1242, steering sensor(s) 1240, brake sensor(s) (e.g., as part of the brake sensor system 1246), and/or other sensor types.

In some examples, the sensor data 102 may be generated by forward-facing and/or side-facing cameras, such as a wide-view camera(s) 1270, a surround camera(s) 1274, a stereo camera(s) 1268, and/or a long-range or mid-range camera(s) 1298. In some examples, more than one camera or other sensor may be used to incorporate multiple fields of view (e.g., the field of view of the long-range cameras 1298, the forward-facing stereo camera 1268, and/or the forward facing wide-view camera 1270 of FIG. 12B).

The components of FIG. 1A may generally be implemented using any combination of the client device(s) 132 and the server device(s) 136. Thus, it should be appreciated that the safe arrival time system 100 may be provided via multiple devices arranged in a distributed environment that collectively provide the functionality described herein, or may be embodied on a single device (e.g., the vehicle 140). Thus, while some examples used to describe the safe arrival time system 100 may refer to particular devices and/or configurations, it is contemplated that those examples may be more generally applicable to the potential combinations of devices and configurations described above. For example, in some embodiments, at least some of the sensors 138, used to generate one or more portions of the sensor data 102, may be distributed amongst multiple vehicles and/or objects in the environment and/or at least one of the sensors 138 may be included in the vehicle 140.

As mentioned above, the communications manager 104 may be configured to manage communications received by the safe arrival time system 100 (e.g., comprising the sensor data 102 and/or the vehicle trajectory information 124) and/or provided by the safe arrival time system 100 (e.g., comprising the safe arrival time data 120 and/or the vehicle trajectory information 124).

Where a communication is received and/or provided as a network communication, the communications manager 104 may comprise a network interface which may use one or more wireless antenna(s) 1226 and/or modem(s) to communicate over one or more networks. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc. However, the communications manager 104 need not include a network interface, such as where the safe arrival time system 100 implemented completely on an autonomous vehicle (e.g., the vehicle 140). In some examples, one or more of the communications described herein may be between components of a computing device 1300 over a bus 1302 of FIG. 13.

The sensor data 102 may be generated using any combination of the sensors 138. For example, the sensor data 102 may include image data representing an image(s), image data representing a video (e.g., snapshots of video), and/or sensor data representing fields of view of sensors (e.g., LIDAR sensor(s) 1264, RADAR sensor(s) 1260, a camera(s) of FIG. 12B, etc.). In the example shown, the sensor data 102 includes image data representative of fields of view of respective cameras of the vehicle 140, which may include one or more images 118A, 118B, and 118C. The images 118A, 118B, and 118C may depict regions of the environment 126, where the regions may include any number of objects, examples of which include objects 128A, 128B, 128C, and 128D. The objects may include any combination of vehicles, people (e.g., pedestrians), motorcycles, bicyclists, trees, animals, buildings, signs, or other structures, objects or obstacles the vehicle 140 may be capable of colliding within the environment 126.

The sensor data 102 may be provided to the object analyzer 106 and used by the object analyzer 106 to analyze objects in the environment 126. For example, the object analyzer 106 may detect one or more of the objects 128A, 128B, 128C, and 128D, identify the one or more of the objects, and/or determine parameters of the one or more of the objects using the sensor data 102. To do so, the object analyzer 106 may employ one or more machine learning models. For example, and without limitation, the machine learning model(s) may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

Examples of parameters of an object that the object analyzer 106 may determine using the sensor data 102 includes one or more of a location (e.g., in the environment 126, such as location coordinates), a pose, a current and/or observed velocity, a maximum velocity, a predicted velocity, at least one dimension (e.g., physical dimensions such as length, width, footprint, height, etc.), a current and/or observed acceleration or deceleration, a maximum acceleration or deceleration, a predicted acceleration or deceleration, a mass, a reaction time, and/or other parameters, such as, but not limited to, those described herein. One or more of the parameters may represent an observed characteristic of the object (e.g., a location/position) and one or more of the parameters may represent an inferred characteristic of the object (e.g., maximum acceleration).

In some examples, a parameter(s) of an object may be an output(s) of a machine learning model(s), such as a convolutional neural network that receives at least some of the sensor data 102 as an input(s). In further examples, the object analyzer 106 may use at least one machine learning model(s) to classify one or more of the objects captured by the sensor data 102. Examples of classifications include stationary, moving, vehicle, car, truck, pedestrian, bicyclist, motorcycle, etc.

The object analyzer 106 may use the classifications to determine one or more of the parameters. For example, a classification may be provided as an input to a machine learning model(s) used to determine one or more of the parameters. As another example, one or more classifications and/or other object information (e.g., other parameters) may be applied to a lookup table(s) or otherwise used to lookup, determine, and/or calculate one or more of the parameters. As an example, a classification may include a vehicle model or type (e.g., sedan, truck, motorcycle, SUV), which has one or more predetermined shapes and/or dimensions, braking capabilities, handling capabilities, acceleration capabilities, maximum velocity, maximum acceleration, etc., that may be used to define one or more parameters. In some examples, a machine learning model(s), such as a convolutional neural network, may be trained to concurrently output a classification of an object and one or more of the parameters of the object.

As examples, the object analyzer 106 may implement object perception using machine learning model(s) (e.g., a neural network(s)) that may be specifically configured (e.g., trained) to recognize certain objects and/or features of the objects. One or more trained machine learning models (e.g., trained and deployed for use by the safe arrival time system 100) used by the object analyzer 106 may determine the presence and/or location of an object (e.g., X and Y coordinates), the object's pose ($\varphi$), the obstacle's dimensions (e.g., Width and Length), and/or a classification for the object. Further, a trained machine learning model (e.g., a neural network(s)) may be used to determine the objects maximum acceleration ($A_{MAX+}$) and maximum deceleration ($A_{MAX-}$).

As further examples, an object's reaction time ($T_{REACT}$) may be determined using a trained machine learning model (e.g., a neural network(s)) that identifies or outputs the type of object (e.g., an object classification) and/or assigns a corresponding reaction time. The reaction time of an object may represent a future time when or a time until the object's motion will begin to be affected by a presence of another object, such as the vehicle 140, in the environment 126. This may correspond to the object perceiving, noticing, and/or determining that a collision may occur with the other object at a target position in the environment. For example, a pedestrian staring at his or her smartphone may have a long reaction time $T_{REACT}$. Likewise, a bicyclist or motorcyclist looking away from the target position may be deemed to have a longer reaction time $T_{REACT}$, than, for example, an attentive driver. In contrast, an object that is an autonomous vehicle (such as a robo-taxi) may have a short reaction time $T_{REACT}$, because an autonomous vehicle may be less susceptible to distraction and may be assumed to be monitoring objects in its path and reacting to the objects more quickly than a human driver.

As examples, the object analyzer may detect one or more of the objects 128A, 128B, 128C, and 128D, identify one the one or more objects 128A, 128B, 128C, and 128D, and/or determine parameters and/or classifications of the one or more of the objects 128A, 128B, 128C, and 128D (e.g., executed on the vehicle 140 and/or the server(s) 127B) using the sensor data 102 and/or other information received from one or more of the objects 128A, 128B, 128C, and 128D, the sensor(s) 138, and/or the client device(s) 132 in the operating environment 130. For example, the communications manager 104 may receive corresponding data over the network(s) 134. Furthermore, one or more of the objects the object analyzer 106 may detect, identify, and/or determine parameters and/or classifications that may not be directly represented by the sensor data 102, but may be inferred, predicted, or otherwise determined to be present or potentially be present by the object analyzer 106 (e.g., based at least in part on the sensor data 102). This may be used to account for blind corners or spots in perception by the safe arrival time system 100.

The object modeler 108 may be configured to model one or more of the objects 128A, 128B, 128C, and 128D in the environment 126 based at least in part on the analysis performed by the object analyzer 106 (e.g., based at least in part on the one or more parameters associated with the object(s)). Additionally or alternatively, the object modeler 108 may filter out one or more of the objects 128A, 128B, 128C, and 128D from modeling (e.g., trajectory modeling). For example, the object modeler 108 may filter out an object based at least in part on a classification of the object (e.g., as stationary) and/or based at least in part on a type of the object. Additionally or alternatively, the object modeler 108 may filter out one or more of the objects 128A, 128B, 128C, and 128D based at least in part on one or more parameters of the object(s), such as any of the parameters determined by the object analyzer 106 (e.g., by filtering out objects based at least in part on locations of the filtered objects being beyond a threshold distance from the vehicle 140). This filtering may reduce the processing power used to determine safe arrival times and may further be used to improve trajectory modeling and generation in lane driving scenarios with vehicles driving parallel to the vehicle of interest in adjacent lanes or with respect to oncoming traffic.

The object modeler 108 may use any suitable approach for modeling the objects in the environment 126, such as by representing each object, for example, as a radial distance function, or a list of known positions of the object in the environment 126 (e.g., represented as a plane). The representation of an object may, for example, be defined using at least one dimension parameter (e.g., width, length), location parameter (e.g., X, Y in the environment 126), and/or pose of the object determined using the object analyzer 106. Optionally a safety buffer may be included in the representation of an object (e.g., by expanding its dimensions). A model for an object may further include one or more motion vectors of the object, such as current and/or instantaneous motion vectors (e.g., observed motion vectors derived from the sensor data 102). For example, each object may have a motion vector and an acceleration vector defined using at least one parameter determined for the object using the object analyzer 106 (e.g., using the object's pose, acceleration/deceleration, and velocity). The object modeler 108 may further model an object using its maximum acceleration and/or deceleration parameters, maximum velocity parameter, and/or mass parameter.

The object modeler 108 may model one or more trajectories of an object using a representation or model of the object. To do so, the object modeler 108 may apply one or more motion profiles to the representation of the object to define the velocity and acceleration of the object at particular times and locations along a trajectory for the object in the environment 126.

Figure 2:
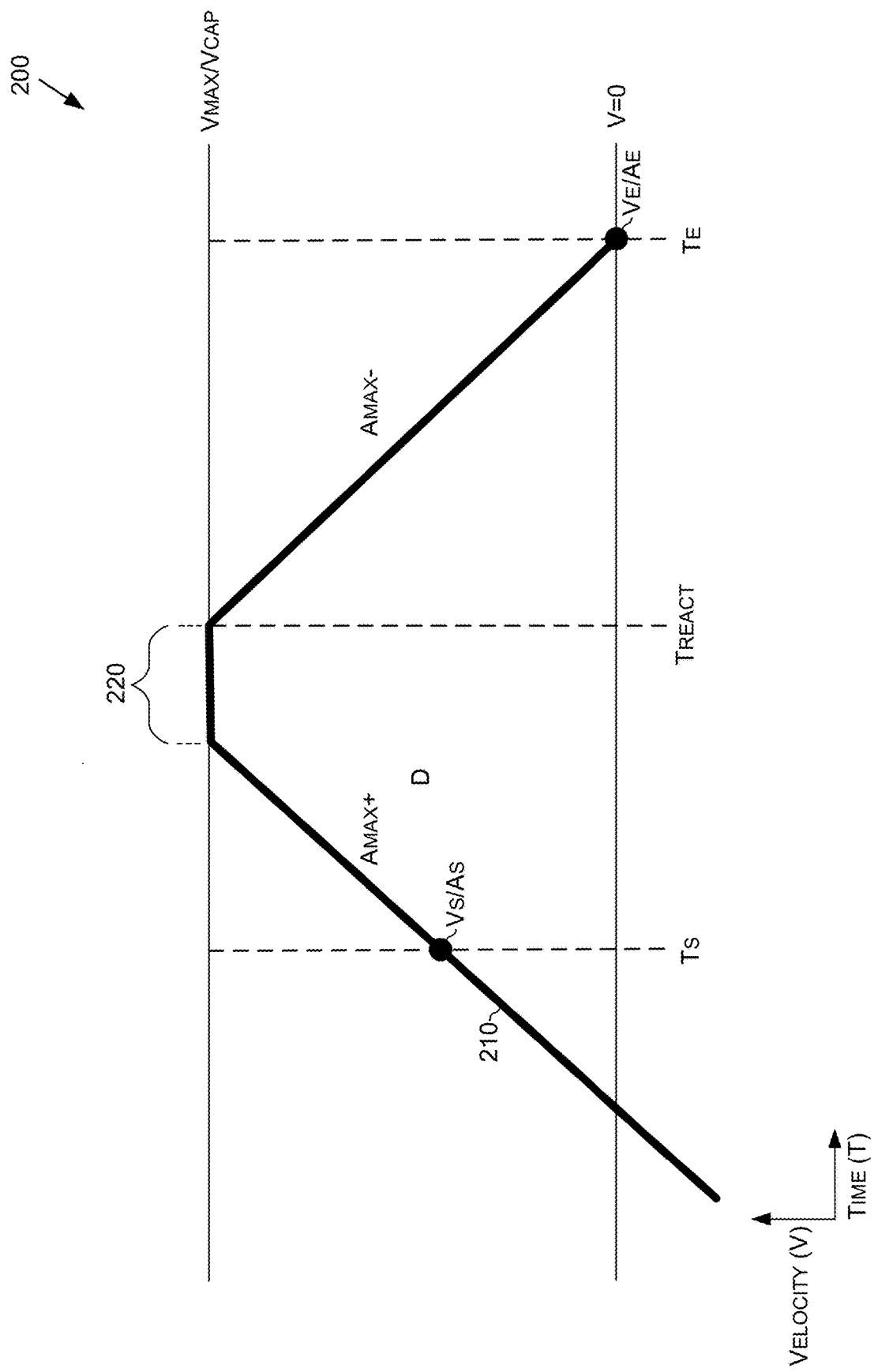
FIG. 2 includes a chart used to describe examples of motion profiles, in accordance with some embodiments of the present disclosure.

Referring now to FIG. 2, FIG. 2 includes a chart 200 used to describe examples of motion profiles that may be used to define modeled trajectories of objects. The chart 200 includes a plot 210 that may correspond to a motion profile that defines motion of an object over time according to a trajectory. The object modeler 108 may represent a motion profile, for example, using one or more functions (e.g., a continuous function) and/or rules, which are used to define the plot 210 for an object.

The motion profile defining the plot 210 may include a number of stages such as a stage where the object follows a trajectory directed to a target position in the environment 126 at maximum acceleration $A_{MAX+}$ (e.g., even if the object is currently moving away from the object), optionally restricted by the maximum velocity $V_{MAX}$, or a velocity cap $V_{CAP}$, a stage where the object begins to decelerate at the maximum deceleration $A_{MAX-}$ (which may optionally be the same as $A_{MAX+}$) until the object comes to a complete stop, and/or a stage where the object remains stopped. A motion profile may include a parameter the object modeler 108 uses to set the time the object begins to decelerate in the motion profile, such as the reaction time $T_{REACT}$ (e.g., as described herein). An observed acceleration $A_{OBS}$ may be used in place of the maximum acceleration $A_{MAX+}$ or maximum deceleration $A_{MAX-}$ and may be adjusted by a safety factor, to allow for the possibility that the observed acceleration is inaccurate, and/or to allow for the possibility that the acceleration may increase.

The motion profile corresponding to FIG. 2 may be used to represent worst case scenarios for the safety of a vehicle, computed as if the vehicle 140 was located at the target position at one or more points in time. The reaction time $T_{REACT}$ in these scenarios may represent the time it takes an operator (e.g., a driver) of an object (e.g., another vehicle) to notice the vehicle at the target position and attempt to avoid a collision at the target position. However, other motion profiles may be used by the object modeler 108 to model one or more trajectories of any of the various objects, which may include any number of stages. Also, one or more of the motion profiles may be more complex than the motion profile described, including conditions or rules on entering stages or used during stages that vary motion of an object based at least in part on the object modeler 108 analyzing and applying variables representative of different features of a state(s) of the environment 126 at a given time(s).

A trajectory modeled by the object modeler 108 may have a start time $T_S$, representative of a start time of the trajectory, and an end time $T_E$, representative of an end time of the trajectory. FIG. 2 shows a particular example of the start time $T_S$ having a starting velocity $V_S$ and a starting acceleration $A_S$. The object modeler 108 may set the starting velocity $V_S$ and the starting acceleration $A_S$ to the current, observed, and/or instantaneous velocity and acceleration parameters provided by the object analyzer 106, or the starting velocity $V_S$ and/or the starting acceleration $A_S$ may be derived from those values.

The example in FIG. 2 indicates that at the start time $T_S$ of the trajectory, the starting velocity $V_S$ and the starting acceleration $A_S$ of the object are positive relative to the vehicle 140, meaning the object is moving towards the vehicle 140 at an increasing rate. However, if the object were to be initially moving away from the vehicle 140 at the start time $T_S$, then the starting velocity $V_S$ and/or the starting acceleration $A_S$ of the object may be negative relative to the vehicle 140. In other examples, either the starting velocity $V_S$ or the starting acceleration $A_S$ may be zero. This may depend upon the stage of the motion profile that the object is in during the start time $T_S$.

FIG. 2 also shows a particular example of the end time $T_E$ having an ending velocity $V_E$ and an ending acceleration $A_E$. The ending velocity $V_E$ and the ending acceleration $A_E$ may be zero relative to the vehicle 140, as shown, indicating that the object has come to a complete stop at the end of the trajectory. However, in other examples, the ending velocity $V_E$ and/or the ending acceleration $A_E$ may be positive or negative at the end of the trajectory. For example, the start time $T_S$ may correspond to any position along the plot 210 depending on what stage the object is at in the motion profile at the start of the trajectory, and similarly, the end time $T_E$ may correspond to any position along the plot 210 after the start time $T_S$ depending on the stage the object is at in the motion profile at the end of the trajectory (e.g., the object may not yet have come to a complete stop). Further, where the object modeler 108 models trajectories for multiple objects using the same motion profile, different objects may be in different stages of the motion profile at the same times. For example, one object may be decelerating to a stop at the start time $T_S$ in its modeled trajectory, and may have remained stopped for a period of time until the end time $T_E$, while a second object may be accelerating toward the vehicle 140 at the start time $T_S$ in its modeled trajectory, and may be traveling at the maximum velocity $V_{MAX}$ at the end time $T_E$.

FIG. 2 illustrates that in some examples, a motion profile may be applied by the object modeler 108 using one or more of the maximum velocity $V_{MAX}$ of an object, the maximum acceleration $A_{MAX+}$ of the object, or the maximum deceleration $A_{MAX-}$ of the object. These values may represent limits on the motion capabilities of the object, and any of these values may correspond to parameters determined for the object using the object analyzer 106, as described herein. By way of example, the plot 210 includes the region 220 in which the object is modeled to reach the maximum velocity $V_{MAX}$ during the modeled trajectory. However, in other trajectories, the object may not reach one or more of the maximum velocity $V_{MAX}$, the maximum acceleration $A_{MAX+}$, or the maximum deceleration $A_{MAX-}$ during the trajectory, or the object modeler 108 may not use one or more of these factors in applying a motion profile.

FIG. 2 also illustrates the velocity cap $V_{CAP}$, which may be accounted for in a modeled trajectory. The velocity cap $V_{CAP}$ may be greater than the maximum velocity $V_{MAX}$ and may correspond to an observed velocity of the object that is greater than the maximum velocity $V_{MAX}$. For example, the velocity cap $V_{CAP}$ may correspond to a parameter that the object analyzer 106 determines, from the sensor data 102, indicating that the object is traveling faster than the maximum velocity $V_{MAX}$ or is capable of traveling faster than the maximum velocity $V_{MAX}$. For example, the object modeler 108 may initially use the maximum velocity $V_{MAX}$ in applying a motion profile for an object to model a trajectory of the object. After determining the object is traveling or has traveled faster than the maximum velocity $V_{MAX}$, the object modeler 108 may instead use the velocity cap $V_{CAP}$ to update the modeled trajectory or to model a different trajectory for the object. A similar approach may be used for maximum acceleration or deceleration.

Figure 3A:
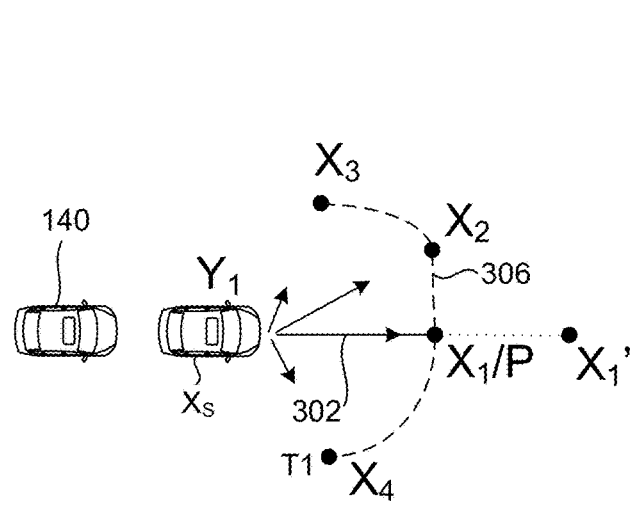
FIG. 3A is an illustration including an example trajectory, in accordance with some embodiments of the present disclosure.

Referring now to FIG. 3A, FIG. 3A is an illustration including an example trajectory 302, in accordance with some embodiments of the present disclosure. The trajectory 302 may correspond to the modeled trajectory described with respect to FIG. 2. The object modeler 108 may model the trajectory 302 of an object $Y_1$ using a start position $X_S$ of the object, corresponding to a location or position of the object $Y_1$ in the environment 126 at the start time $T_S$. The object modeler 108 may also model the trajectory 302 using an end position $X_1$ of the object $Y_1$, corresponding to a location or position of the object $Y_1$ in the environment 126 at the end time $T_E$.

The start position $X_S$ of the object $Y_1$ may correspond to a location parameter determined using the object analyzer 106. The location parameter may be determined, for example, in real-time or near real-time by the object analyzer 106, such that the start position represents a substantially current position of the object $Y_1$ in the environment 126. However, the start position $X_S$ may in some examples be a predicted current or future location of an object in the environment, such as where the object $Y_1$ is obscured from being perceived by the sensor(s) 138, where the object $Y_1$ does not necessarily exist in the environment, but is modeled to account for blind corners or spots in perception by the safe arrival time system 100, or other scenarios.

In FIG. 3A, the object modeler 108 may have modeled the trajectory 302 to head directly toward the end position $X_1$ of the object $Y_1$ (e.g., a target position in the environment 126 for which a safe arrival time is being determined), as shown. This approach may be used by the object modeler 108 in conjunction with the motion profile described above to model a worst case scenario in which the operator of the object $Y_1$ attempts to reach the end position $X_1$ as quickly and directly as possible. The object modeler 108 may use a similar approach in determining safe arrival times for each target position in the environment 126 and each modeled object in the environment, or one or more trajectories may follow other paths and/or use different motion profiles. In some examples, the object modeler 108 may make a determination to use a default path and/or motion profile to model a trajectory (e.g., the motion path corresponding to the plot 210 and a direct path), and in others, the object modeler 108 may make a determination to use a different path and/or motion profile to model a trajectory (e.g., where a planned trajectory for an object is known, for example after being provided by the object).

The object trajectory analyzer 110 may be configured to analyze the trajectories modeled by the object modeler 108 to compute one or more safe arrival times and/or safe time intervals for the vehicle (e.g., the vehicle 140). For example, the object trajectory analyzer 110 may use modeled trajectories to determine where an object will be in the environment 126 or may be in the environment 126 at any given time, and the velocity and acceleration of the object at those positions. Thus, the object trajectory analyzer 110 may compute at what times a vehicle (e.g., the vehicle 140) may safely occupy those positions without resulting in a collision with the object. These times may be referred to as safe arrival times for the vehicle to those positions. However, a safe arrival time may alternatively be evaluated under other criteria, such as that a collision that results would have less than a threshold impact, which may be computed based at least in part on the modeled mass and velocity of the object, or that the collision has less than a threshold probability of occurring.

In some examples, to determine at least one safe arrival time for the end position $X_1$, the object modeler models the trajectory 302 to the end position $X_1$. Based at least in part on computing that the object $Y_1$ will come to a complete stop at (or in other examples prior to) the end time $T_E$ of the trajectory 302, the object trajectory analyzer 110 may determine that the end time $T_E$, and/or any time prior to the end time $T_E$ in the trajectory 302 is a safe arrival time of the vehicle to the end position $X_1$. For example, given a target position P in the environment, because it may be determined that the end position $X_1$ has an end time $T_E$ where the object $Y_1$ may stop at the target position P under a worst case scenario for the trajectory of the object, the end time $T_E$ may be deemed a safe arrival time for the target position P. Thus, it may be assumed that any time earlier is also a safe arrival time to the target position P. As such, the start time $T_S$ and the end time $T_E$ of the trajectory 302 may constitute a safe time interval for the vehicle with respect to the object $Y_1$ and the target position P. In other examples, the object $Y_1$ may not come to a complete stop prior to the end time $T_E$ of the trajectory 302, and may instead have an end position $X_1'$. The object trajectory analyzer 110 may check for this condition by testing whether the maximum of a quadratic parabola takes at least a point of the modeled object further than a starting distance between the at least one point and the end position $X_1'$. In this case, it may be determined the safe arrival time is zero for the target position P and the object $Y_1$ because it is possible for the object $Y_1$ to put itself in a state that it is already committed to passing the target position P.

Another case where the same arrival time may be set to zero may be where the object $Y_1$ is committed to the target position P from the beginning, and the parabola of acceleration in the opposite direction passes through the target position P. As an example, this may occur if the target position P were at the start position $X_S$ of the trajectory 302. This may happen, for example, when the vehicle 140 is following the object $Y_1$, which is a lead vehicle that is moving at a rapid pace away from the vehicle 140 (an example of which is shown in FIG. 3A). In that case, the vehicle 140 may inevitably pass some positions in front of it (and typically passes through them). Here, it may be clear the parabola is past the target position P for a time interval (e.g., an unsafe time interval).

A non-limiting example of computing a safe arrival time with respect to the object $Y_1$ at an obstacle point Y (e.g., the start position $X_S$ in a plane) and a target point X (e.g., the target position P in the plane) follows. Given the object $Y_1$ at the obstacle point Y having a velocity vector V (e.g., the starting velocity $V_S$ the in the plane), a scalar maximum velocity $v_{max}$ (e.g., the maximum velocity $V_{MAX}$), a scalar maximum acceleration $a_{max}$ (e.g., the maximum acceleration $A_{MAX}$) and a reaction time T react (e.g., the reaction time $T_{REACT}$), a scalar distance d may be computed as $$d = |X - Y|$$

and scalar (signed) velocity v may be computed as $$v = dot\left(V, \frac{X-Y}{d}\right).$$

In some examples, this may be generalized to any function that distributes a maximum starting velocity to each direction, the dot product making a concrete suggestion for such a function. A safe arrival time $t_{lsa}$ (e.g., a latest safe arrival time) for the object $Y_1$ at the obstacle point Y may be computed by the following of formulas:

$$V_{cap} = \max(v, v_{max})$$

$$A = d + \frac{v^2}{2a_{max}} t_{pre} = \begin{cases} \sqrt{\frac{A}{a_{max}}}, & Aa_{max} < v_{cap}^2 \\ \frac{A}{v_{cap}}, & \text{otherwise} \end{cases}$$

$$t_{lsa} = \max\left(0, t_{pre} - \frac{v}{a_{max}} - \tau_{react}\right).$$

For each target position in the plane, the minimum of all of the safe arrival times $t_{lsa}$ from all the objects (e.g., points) may be computed in parallel. If the input is a radial distance function, the time may be set to zero for all points on the rays further away than the radial distance function. This approach may be used by the visualization generator 112 to produce a visualization (e.g., image). Further, in some examples, any of the safe arrival times $t_{lsa}$ for any of the objects may be computed at any suitable time, such as to test and/or generate paths and/or trajectories (e.g., as needed, which may not involve generating a visualization).

In any example, the object modeler 108 and the object trajectory analyzer 110 may account for additional factors used to determine safe arrival times. For example, a slope to target position P may be estimated using the sensor data 102 received and processed by the object analyzer 102. An uphill slope to the target point may be used as a factor to reduce the accelerations (or increase the deceleration) to the target point. Similarly, a road surface coefficient μ may be estimated using information received and processed by, for example, a perception block of the vehicle 140 (e.g., similar to object perception which may be performed by the object analyzer 106). For example, a trained neural network(s) may detect the presence of ice, snow, or oily roads and return a road surface coefficient which may be used as a factor that reduces the maximum deceleration to the target position P.

FIG. 3A also shows end positions $X_2$, $X_3$, and $X_4$ of other trajectories that the object modeler 108 may model, such as using the motion profile corresponding to the plot 210 or a different motion profile(s) and/or a direct path to each of the end positions $X_2$, $X_3$, and $X_4$ (or a different type of path). The end positions $X_2$, $X_3$, and $X_4$ are provided as examples of positions in trajectories that have at least one safe arrival time (and potentially safe time interval) in common. This may be represented in FIG. 3A with the end positions $X_1$, $X_2$, $X_3$, and $X_4$ plotted in a time-space domain forming points of a contour 306 that represents the safe arrival time shared between positions in the environment 126. The contour 306 may additionally or alternatively be representative of a shared safe time interval of the positions (e.g., with the contour 306 representing an end time of the interval). As described below, the contour 306 may be used by the safe arrival time system 100 to determine whether a position(s) would be safe for the vehicle 140 to occupy at a given time(s). For example, the safe arrival time system 100 may use the contour 306 to detect a potential intersection of the vehicle 140 with the contour 306 in the time-space domain indicating the given time(s) and position(s) would be unsafe as a collision may occur.

While FIG. 3A is described with respect to the object trajectory analyzer 110 analyzing positions and times with respect to a single object $Y_1$, in computing one or more safe arrival times and/or safe time intervals for a vehicle, the object trajectory analyzer 110 may account for any number of objects, such as any of the various objects modeled using the sensor data 102. For example, FIGS. 3B and 3C illustrate contours representative of safe arrival times that account for multiple objects in the environment.

Figure 3C:
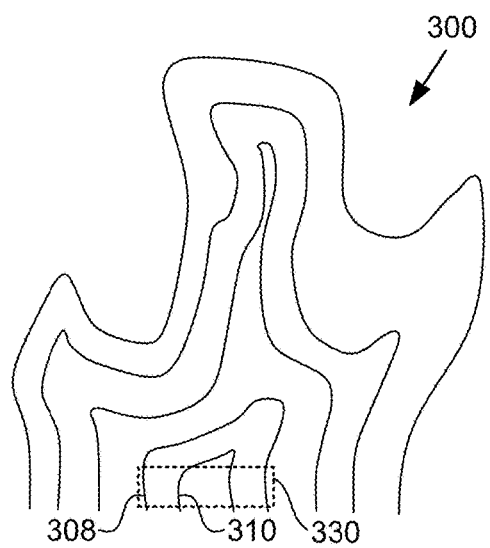
FIG. 3C is an illustration of a contour map representative of safe arrival times, in accordance with some embodiments of the present disclosure.
Figure 3B:
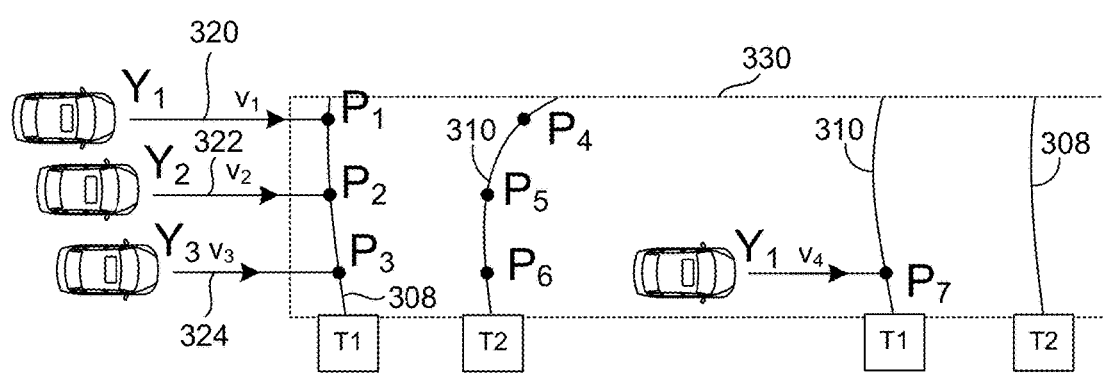
FIG. 3B is an illustration of a portion of a contour map representative of safe arrival times, in accordance with some embodiments of the present disclosure.
Figure 3B:
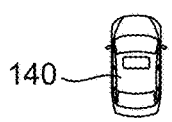

In FIG. 3B, the object $Y_1$ may correspond to the object 128A of FIG. 1A, the object $Y_2$ may correspond to the object 128B of FIG. 1A, and the object $Y_3$ may correspond to an object that is not represented in the sensor data 102, but is modeled using the object modeler 108 (or may correspond to the object 128C). For any of the target positions $P_1$, $P_2$, $P_3$, $P_4$, $P_5$, $P_6$, and $P_7$ the object trajectory analyzer 110 may use the safe arrival time and/or safe time interval of the object that occurs earliest amongst the modeled objects and trajectories for a particular target position. For example, for the target position $P_1$, the object trajectory analyzer 110 may use the safe arrival time for the object $Y_1$, as it occurs prior to safe arrival times of the objects $Y_2$ and $Y_3$ for the target position $P_1$.

The safe arrival times and/or safe time intervals used by the object modeler 108 for the target positions $P_1$, $P_2$, and $P_3$ may be represented in FIG. 3B as plotted in a time-space domain forming points of a contour 308 that represents the safe arrival time T1 (and/or safe time interval) along corresponding positions in the environment 126 (e.g., similar to the contour 306) but accounting for multiple objects. Similarly, the safe arrival times and/or safe time intervals used by the object modeler 108 for the target positions $P_4$, $P_5$, $P_6$, and $P_7$ may be represented in FIG. 3B plotted in the time-space domain forming points of a contour 310 that represents the safe arrival time T2 (and/or safe time interval) along positions in the environment 126.

FIG. 3C shows a contour map 300 comprising additional portions of the contours 308 and 310 of FIG. 3B, as well as other contours for different safe arrival times and/or safe time intervals and positions in the environment 126. A region 330 in FIG. 3C may correspond to the region 330 in FIG. 3B. Although the contours of FIG. 3C correspond to multiple objects, in other examples any of those contours may correspond to a single object. Further, an infinite number of contours may exist with each corresponding to a different safe arrival time and/or safe time interval (if any). In any example, the safe arrival time data 120 may be representative of one or more of the contours, portions of the contours, and/or corresponding target positions and safe arrival times. Further, in some examples, the safe arrival time data 120 may comprise image data representative of an image(s) that captures any of the forgoing information. For example, the image may be similar to what is shown in FIG. 1A. The visualization generator 112 may generate the image as a visualization based at least in part on the safe arrival times. Data values of an image (e.g., pixel values, vector graphics values, analog values, digital values, etc.) used as a visualization may be computed in parallel, such as by using parallel processing, which may occur on one or more graphics processing units (GPUs), such as the one or more graphics processing units (GPUs) 1308 of FIG. 13, the GPU(s) 1208 of FIG. 12C, and/or the GPU(s) 1220 of FIG. 12C.

The image shown in FIG. 1A has data values (e.g., pixel values, vector graphics values, analog values, digital values, etc.) that are representative of at least portions of safe time intervals. For example, the visualization generator 112 may use one or more pixels or points of a visualization to represent safe arrival times, such as by setting brightness values, color values, and/or other values associated with the pixels or points or used to generate the pixels or points. Each point or pixel of a visualization generated by the visualization generator 112 may be representative of a safe arrival time and a position in the environment 126. The location of the point or pixel in the visualization may correspond to the position in the environment 126, and the coloration or other properties of the point or pixel in the visualization may correspond to the safe arrival time for the position.

In the image of FIG. 1A, each safe arrival time and associated pixel/point and position may correspond to an end time of a safe time interval, and all of the safe time intervals may have the same start time. Using this approach, the data values (e.g., color values) of the pixels or points may form a contour map including a gradient of contours, as shown in FIG. 1A. In the example shown, white pixels or points have an infinite safe time interval value, indicating those positions are considered safe regardless of when the vehicle 140 arrives at them (e.g., corresponding objects may always stop before colliding with the vehicle if the vehicle were at those locations). In contrast, black pixels or points have a safe time interval value of zero, indicating those positions are considered unsafe regardless of when the vehicle 140 arrives at them (e.g., corresponding objects may never stop before colliding with the vehicle if the vehicle were at those locations). The gradient of pixel or point values moving from black to white may correspond to an increase in safe time intervals from zero to infinity. The visualization generator 112 may determine the data value for a position by applying the safe arrival time for that position to a function, which may have a linear relationship between the safe arrival time and the data value, as an example.

As shown, arrow 150 (not part of the safe arrival time data 120) may indicate a position of the vehicle 140 at the start time of the safe time intervals. The safe arrival times may be plotted relative to the position of the vehicle 140 and the start time, by way of example. The arrow 152 (not part of the safe arrival time data 120) may indicate a position of the object 128A at the start time and an arrow 154 (not part of the safe arrival time data 120) may indicate a position of the object 128B at the start time.

Figure 4A:
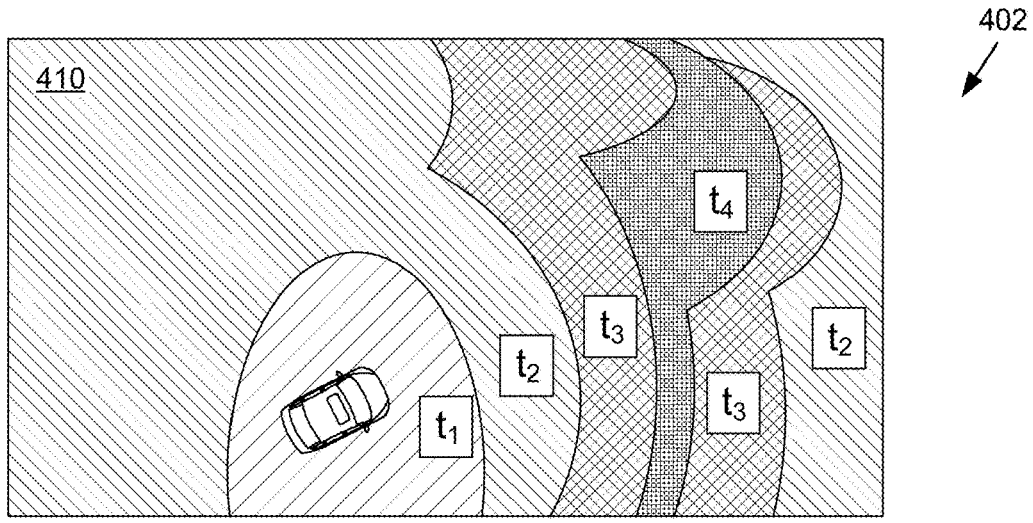
FIG. 4A is an illustration of a visualization of safe arrival times, in accordance with some embodiments of the present disclosure.
Figure 4B:
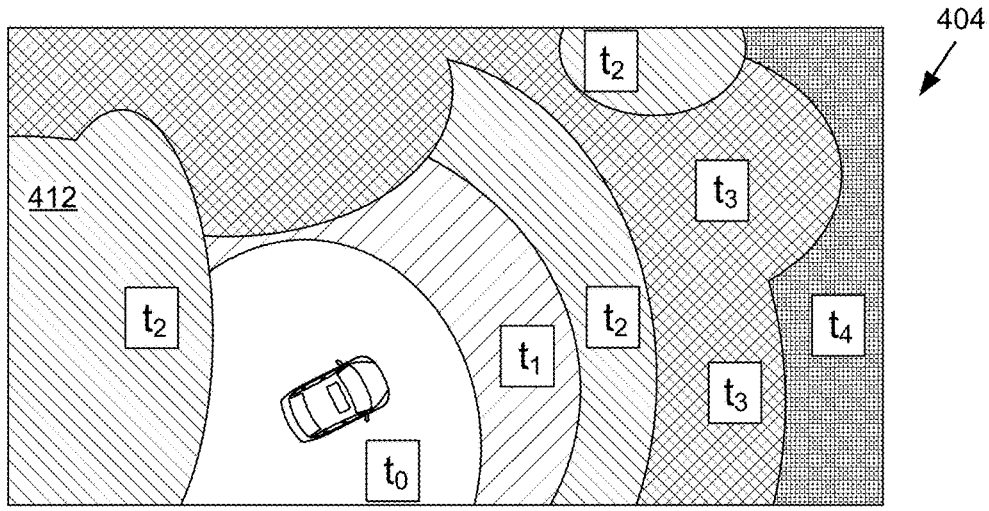
FIG. 4B is an illustration of a visualization of safe arrival times, in accordance with some embodiments of the present disclosure.
Figure 4C:
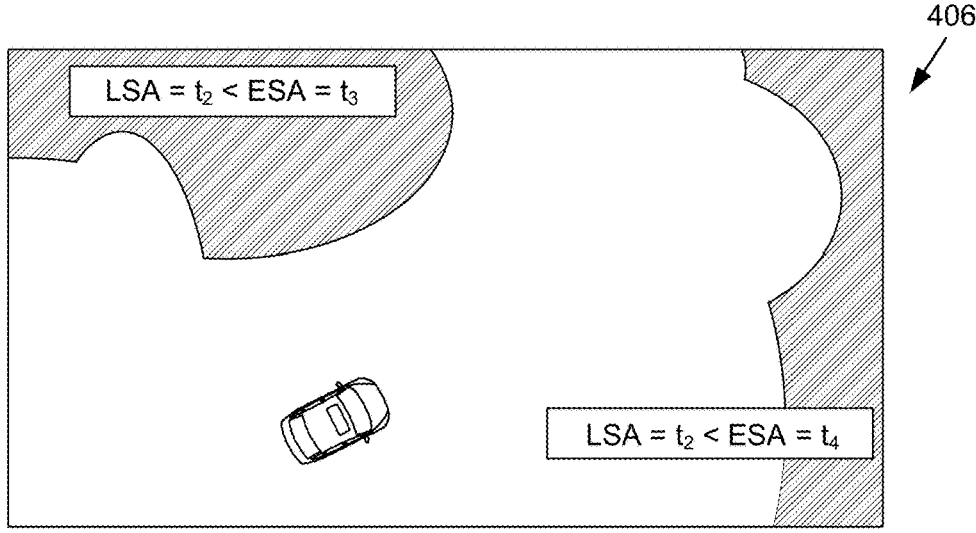
FIG. 4C is an illustration of a visualization of safe arrival times, in accordance with some embodiments of the present disclosure.

FIGS. 4A, 4B, and 4C show further examples of visualizations 402, 404, and 406 of safe arrival times, in accordance with some embodiments of the present disclosure. In some examples, the visualization generator 112 may generate one or more of the visualizations 402, 404, or 406 in addition to or instead of the visualization shown in FIG. 1A. The visualization generator 112 may determine whether positions in the environment each have a safe arrival time that falls within a particular time range. The visualization generator 112 may set the pixels or points that correspond to those positions with the same data value to represent the particular time range. Pixels or points for different time ranges may be set to different data values. Thus, comparing the visualization of FIG. 1A to FIG. 4A and FIG. 4B, adjacent pixels or points that form a portion of a gradient of contours in FIG. 1A may instead have the same data value(s) (e.g., the same color, the same brightness, etc.) thereby being grouped into a single contour. In some examples, the visualization generator 112 may generate a visualization similar to the visualization 402 using the visualization shown in FIG. 1A.

The visualization generator 112 may generate the visualization 402 of FIG. 4A and the visualization 404 of FIG. 4B using a similar process. However, the object trajectory analyzer 110 may have determined safe arrival times for those visualizations under different constraints or assumptions regarding what is considered a safe arrival time. As an example, the visualization 402 may be based at least in part on a constraint that any position in the environment that an object may occupy in a modeled trajectory, according to the motion profile(s), is unsafe. Safe arrival times computed using this approach may be referred to as Latest Safe Arrival times (LSAs). However, this constraint may be relaxed in other approaches. For example, safe arrival times for the visualization 404 may be computed using a similar approach as the visualization 402, but without the constraint that any position in the environment that an object may occupy in a modeled trajectory, according to the motion profile(s) is unsafe. Thus, safe arrival times computed using this approach may occur earlier than corresponding LSAs and may be referred to as Earliest Safe Arrival times (ESAs). For example, an ESA may represent the earliest time the vehicle 140 may occupy a target position without resulting in a collision with an object.

For example, for an ESA, the object trajectory analyzer 116 may not consider a target position unsafe where the object is committed to the target position P from the beginning, and the parabola of acceleration in the opposite direction passes through the target position. This may happen, for example, when the vehicle 140 is following the object, which is a lead vehicle that is moving at a rapid pace away from the vehicle 140. In this case, although the parabola is past the target position for a time interval, that time interval may still correspond to an ESA interval. To compute an ESA, the trajectory modeler 302 may use a motion profile in which the object brakes suddenly and with maximum force (e.g., at maximum deceleration $A_{MAX-}$, or using the observed acceleration $A_{OBS}$ optionally with a safety factor adjustment). Given this modeled trajectory, the object trajectory analyzer 116 may determine when (if ever) the object will be a safe distance away from a target position, such that the vehicle 140 may safely arrive at the target position. This time may be used as an ESA interval. In this manner, an ESA contour map may be created, representing ESAs (and optionally ESA intervals) at each target position.

In any example, a constraint on a safe arrival time may include that the autonomous vehicle 140 is always in a state where the vehicle 140 may apply at least a maximum braking profile to come to a full stop without a collision. Instead of the maximum braking profile, in some examples a comfort barking profile is used. In some examples, multiple braking profiles are available and may be used as a constraint under different scenarios (e.g., selected by the object trajectory analyzer based on a perceived state(s) of the environment).

The visualization generator 112 may generate the visualization 406 of FIG. 4C using safe arrival times that are generated under different constraints or assumptions. For example, the visualization 406 may be generated using both LSAs and ESAs for target positions in the environment. In the example shown, pixels or points having a first data value (e.g., a first color value), represented as a white region in FIG. 4C, correspond to positions in the environment where it is possible for a vehicle to safely occupy the positions during at least some time without resulting in a collision according to each of the constraints or assumptions (e.g., of both ESAs and LSAs). Pixels or points having a second data value (e.g., a second color value), represented as a shaded region in FIG. 4C, correspond to positions in the environment where it is determined to be not possible for the vehicle to safely occupy the positions during at least some time without resulting in a collision according to each of the constraints or assumptions (e.g., of both ESAs and LSAs).

For example, in FIGS. 4A-4C, regions of the visualization may be labeled using safe time ranges $t_0$, $t_1$, $t_2$, $t_3$, and $t_4$. The safe times ranges $t_0$, $t_1$, $t_2$, $t_3$, and $t_4$, may increase in time from left to right and collectively may form a continuous time range spanning a start time of the safe time range $t_0$ to an end time of the safe time range $t_4$. Because, for example, positions corresponding to a region 412 of the visualization 404 of FIG. 4B have ESAs that occur after LSAs of corresponding positions in a region 410 of the visualization 402 of FIG. 4A, it may be determined that no time at those positions may satisfy both the LSA and ESA constraints or assumptions regarding the safety of occupying the positions (e.g., the safe time range $t_2$ of the region 410 in FIG. 4A comes before the safe time range $t_3$ of the region 412 in FIG. 4B).

In examples described herein, where a visualization representative of safe arrival times is analyzed to test the safety of times and positions of a vehicle, the visualization 406 may be used as a mask to indicate regions of the visualization and corresponding positions in the environment 126 that need not be analyzed as candidates for positions of a vehicle. This may reduce the processing time for analyzing and/or generating trajectories using multiple approaches to safe arrival times. For example, the visualization 402 may be masked using the visualization 406 and used to analyze or generate a trajectory for a vehicle and/or the visualization 404 may be masked using the visualization 406 and used to analyze or generate a trajectory for a vehicle.

Visualizations generated using the visualization generator 112 may be used for various purposes. For example, the proposed path or trajectory analyzer 114 may be configured to analyze a proposed trajectory or path (e.g., represented by the vehicle trajectory information 124) using the safe arrival time data 120 (e.g., the image represented by the safe arrival time data 120). The path or trajectory generator 116 may be configured to generate a trajectory (e.g., represented by the vehicle trajectory information 124) using the safe arrival time data 120 (e.g., the image represented by the safe arrival time data 120). Either the proposed path or trajectory analyzer 114 or the path or trajectory generator 116 may use any combination of the visualizations described above to perform these processes. However, in some examples, either the proposed path or trajectory analyzer 114 or the path or trajectory generator 116 may use the safe arrival time data 120 in a different form, and the object trajectory analyzer 110 may compute safe arrival times and/or safe time intervals for positions in the environment 126 as needed.

The vehicle trajectory information 124 may include, in some examples, a trajectory point(s) 142 (e.g., as represented by (x, y) coordinates) along the trajectory 144. In some examples, only a single trajectory point (e.g., the next trajectory point for the vehicle 140 in a sequence of discretized trajectory steps) may be analyzed by the proposed path or trajectory analyzer 114 and/or generated by the path or trajectory generator 116. In other examples, more than one trajectory point may be analyzed and/or generated. As another example, an entire trajectory may be analyzed and/or generated, which may be extrapolated from two or more trajectory points 142 (e.g., using a spline).

In any example, the trajectory 144 may form a radius of the trajectory 144, or may form an inverse radius of the trajectory 144. The trajectory 144 and/or the trajectory point(s) 142 thereon, may be used by a control component(s) to determine the controls required to control the vehicle 140 according to the trajectory 144. For example, the control component(s) may send one or more controls to one or more actuators (e.g., actuators controlled by an actuation layer of the autonomous driving software stack). The actuators may include one or more components or features of the brake sensor system 1246, the propulsion system 1250, the steering system 1254, and/or other systems. In other examples, the vehicle trajectory information 124 may include the controls for controlling the vehicle according to the trajectory 144.

Figure 5:
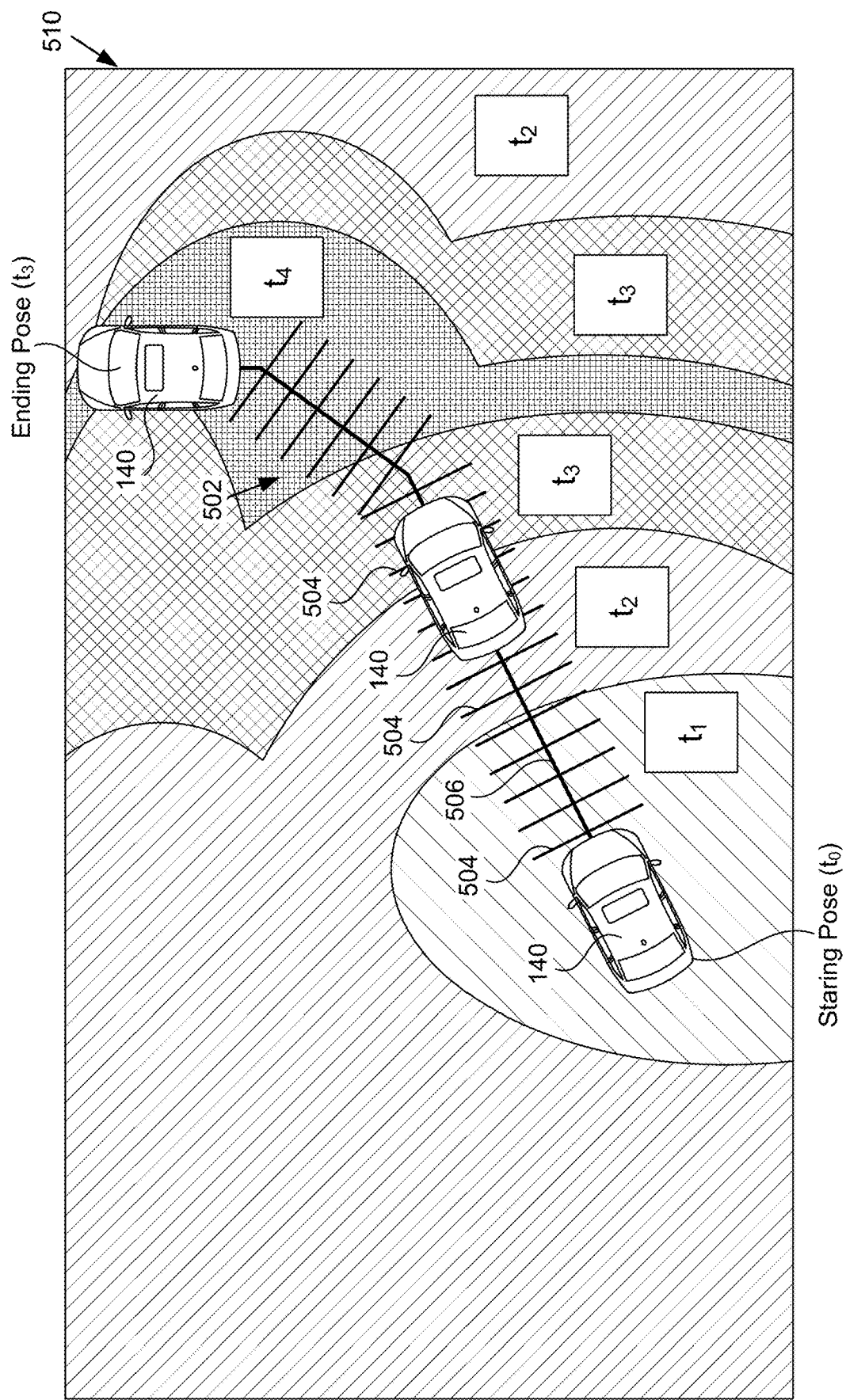
FIG. 5 is an illustration including an example of a trajectory with a visualization of safe arrival times, in accordance with some embodiments of the present disclosure.

Now referring to FIG. 5, FIG. 5 is an illustration including an example of a trajectory 502 for a vehicle 140 with a visualization 510 of safe arrival times, in accordance with some embodiments of the present disclosure. The vehicle 140 may correspond to the vehicle 140 of FIG. 1A. The trajectory 502 may be a proposed trajectory that the proposed path or trajectory analyzer 114 tests for safety according to safe arrival times and/or safe time intervals for positions in the environment (e.g., optionally using the visualization 510). The trajectory 502 may have been generated by another system or component (e.g., a separate behavioral planner of the vehicle 140), which may not have accounted for the safe arrival times and/or the safe time intervals, as examples. Further, the trajectory 502 may correspond to the trajectory 144, and may be represented using any suitable approach including using the trajectory point(s) 142 described above, and/or a spline function.

The proposed path or trajectory analyzer 114 may test the trajectory 502 with a motion profile of the vehicle 140 that defines the trajectory 502. As an example, the motion profile may include a maximum braking profile of the vehicle 140 or a comfort braking profile of the vehicle 140. The proposed path or trajectory analyzer 114 may take a profile of the vehicle 140 and assume the braking profile or other motion profile. The braking profile may include a current acceleration and velocity state of the vehicle 140 causing the motion profile during the reaction time. This may be followed by a braking ramp-up optionally limited by jerk limit, and finally maximum braking of the profile, until stop occurs, if ever, during any of those stages. The proposed path or trajectory analyzer 114 may assume any shape of the vehicle 140 plus an optional safety margin, and check that shape against the safe arrival times at any target position (e.g., using the visualization 510) during the braking profile along a path 506 being tested.

By ensuring the path 506 may safely be used with a braking profile, the proposed path or trajectory analyzer 114 may ensure a trajectory that follows the path 506 (which may or may not be the trajectory 502) is at least safe enough to brake in time, if the braking profile were to be triggered. The proposed path or trajectory analyzer 114 may consider the path 506 unsafe where it is determined that at least the comfort braking profile would result in a collision, and especially where it determines the maximum braking profile would result in a collision. In some examples both profiles may be tested for the same vehicle 140, but used for different purposes. For example, the maximum braking profile may be used as a fail-safe to test trajectories prior to deployment, whereas the comfort braking profile may be used for higher level planning.

For example, the vehicle 140 may use the braking profiles to effectively set a safety zone around the vehicle 140, test for that, and engage in maximum braking (e.g., with latching, such as latching in a Schmidt-trigger) if the test does not pass (for example along the path that is closest to passing the test). This may provide safety to the vehicle 140 from collision. To also provide comfort, a slightly stricter test may also be done and a more classic controller (such as a Proportional Integral Derivative (PID) controller) may be used to control velocity of the vehicle 140 to stay on the boundary of the stricter test and hold the path that is closest to passing the test among a set of paths (e.g., the set of paths that do not deviate too far from a nominal rail). The proposed path or trajectory analyzer 114 may, in various examples, test a proposed path and/or trajectory from a long-term planner.

To test the safety of the trajectory 502, the proposed path or trajectory analyzer 114 may analyze the trajectory 502 to determine whether there is any time during the trajectory 502 at which the vehicle 140 would occupy a position(s) in the environment 126 outside of a safe time interval(s) for the position(s). For example, the proposed path or trajectory analyzer 114 may evaluate a proposed arrival time for the vehicle to a position to determine whether the proposed arrival time is a safe arrival time for the position. If the proposed path or trajectory analyzer 114 determines the proposed arrival time is not a safe arrival time, the proposed path or trajectory analyzer 114 may generate data representative of the trajectory 502 failing the test, otherwise the proposed path or trajectory analyzer 114 may still generate data representative of the trajectory 502 passing the test (e.g., assuming all other proposed arrival times are similarly found to be safe).

As another example, the proposed path or trajectory analyzer 114 may determine a level or degree of safety for a target position representative of how close an arrival time for the trajectory 502 to the target position is to a safe arrival time for the target position. The proposed path or trajectory analyzer 114 may deem the trajectory 502 unsafe where the level or degree of safety for at least one target position is below a threshold value. Where all target positions are within the threshold value for the trajectory 502, the proposed path or trajectory analyzer 114 may still determine the trajectory is safe. As a further example, the proposed path or trajectory analyzer 114 may assign a level or degree of safety to the overall trajectory 502, which may correspond to the level or degree of safety at multiple target positions (e.g., a worst level or degree of safety, an average level or degree of safety, a level or degree of safety otherwise statistically derived from multiple target positions, etc.).

The proposed path or trajectory analyzer 114 may use various approaches to test the safety of the trajectory 502. In some examples, the proposed path or trajectory analyzer 114 may test a number of samples 504 of the trajectory 502 along the path 506 of the trajectory 502. In FIG. 5, each sample may be represented using a line that is perpendicular to the path 506. A sample may comprise, for example, a proposed arrival time(s) of the trajectory 502 and a position(s) of the vehicle 140 in the path 506 at the proposed arrival time(s). To test the sample, the proposed path or trajectory analyzer 114 may analyze the proposed arrival time(s) and the position(s) to determine whether any portion of the sample (e.g., on or more position/proposed arrival time pairs) does not correspond to a safe arrival time. For example, where the proposed path or trajectory analyzer 114 determines that a proposed arrival time for a position is not a safe arrival time for that position, the proposed path or trajectory analyzer 114 may determine the trajectory 502 is unsafe, and the trajectory may fail the test.

As examples, the positions of a sample may be represented by the line that is perpendicular to the path 506, or a sample may include a single position of the line. As another example, the positions may form a two dimensional shape, such as a bounding box around the vehicle 140. As a further example, the positions may include any number of points that correspond to at least some of the outline of the vehicle 140. In any example, the positions may be based at least in part on a shape of the vehicle. Further, the shape of the samples may be determined using one or more parameters provided by the object analyzer 106. Also in any example, the proposed path or trajectory analyzer 114 include or add a safety buffer to the positions used for a sample such that the positions represent an area that is larger in at least one dimension than the vehicle 140.

The proposed path or trajectory analyzer 114 may adopt several simplifying assumptions in testing the safety of the trajectory 502 (and/or the path 506). For example, one simplifying assumption may recognize that once one point on the vehicle 140 arrives (e.g., the front bumper) at the target position, the target positions that follow behind do not need to be tested. In other words, if the vehicle 140 has a front bumper that has already arrived at a target position, there may be no reason to perform an additional safety check to determine when other points on the vehicle 140 (hood, front windshield) arrive at the target position. Thus, tested samples may substantially only correspond to the leading edge of the vehicle in some examples or for some samples. Thus, the proposed path or trajectory analyzer 114 may treat the vehicle 140 as approximately sliding through the target positions. Only a bar perpendicular to the path 504 (e.g., a line or contour of a front, rear, or other portion of the vehicle 140) sized to the width of the vehicle 140 (plus an optional safety margin) may be tested. This bar may start at the rear of the vehicle 140 and move forward by the safety margin during time zero, then move forward over time by the motion profile (e.g., exactly by the motion profile).

The proposed path or trajectory analyzer 114 may thus either test one path with a 2D or reduced set of operations, or if considering the vehicle 140 to be mostly pointing along the main direction of travel and the bars as parallel, several approximately parallel paths with a 2D or reduced set of operations.

Another example of simplifying testing (e.g., in the case of working with a radial distance function) may be for the proposed path or trajectory analyzer 114 to first pre-process the safe arrival times so that the safe arrival times are monotonically decreasing along radial rays from the vehicle 140 (e.g., always decreasing), and then test the end points of the bars, and the final bar, since if there is any violation, it would also occur on the perimeter of the shape the bar traces out in the plane of the environment 126.

FIG. 5 shows the trajectory 502 superimposed over the visualization 510. The visualization 510 may correspond to, for example, the visualization 402 of FIG. 4A, with regions and/or pixels or points of the visualization 510 being representative of safe arrival times for those positions. However, in other examples, the visualization 510 may correspond to the visualization 404 or a visualization generated under different constraints of assumptions regarding safe arrival times. In any example, the visualization 510 may be used to test and/or generate a trajectory and may be similar to the visualization of FIG. 1A, as opposed to having different safe arrival times grouped into time ranges. Further, in some examples, the visualization need not be generated or used to test and/or generate a trajectory or path. In particular, in the description herein, any of the safe arrival times and/or safe time intervals used to test and/or generate a trajectory or path (or for other purposes) may or may not be sourced from sensor data or a visualization of the sensor data (e.g., an image). For example, using data values from a visualization to determine safe arrival times or safe time intervals for positions in the environment (e.g., samples) may make it more difficult, in some cases, to avoid or minimize discretization errors.

By way of example, the proposed path or trajectory analyzer 114 may use safe arrival times (e.g., represented at positions in the visualization 510) to test the corresponding positions of the vehicle 140 and proposed arrival times to those positions along the trajectory 502. As mentioned above, the pixels or points of the visualization 510 may correspond to LSAs in the visualization 510 with each pixel or point representing an LSA interval ending at the safe arrival time represented by a data value(s) of the pixel or point. The proposed path or trajectory analyzer 114 may determine that the trajectory 502 is safe by determining that each proposed arrival time of each sample is within the corresponding safe time intervals associated with the positions of the vehicle 140. For example, for an LSA, a proposed arrival time and position may be considered safe based at least in part on the proposed arrival time being at or before the safe arrival time for the position (e.g., represented by a pixel or point). In contrast, for an ESA, a proposed arrival time and position may be considered safe where the proposed arrival time comes at or after the safe arrival time for the position (e.g., represented by a pixel).

The proposed path or trajectory analyzer 114 may evaluate safety using other criteria with respect to the proposed arrival times and corresponding safe arrival times. In some examples, the safe arrival times used by the proposed path or trajectory analyzer 114 may be generated at any suitable time, such as computed at least partially in a visualization or other format prior to the proposed path or trajectory analyzer 114 testing a trajectory, and/or as needed or in parallel with testing and/or generating a trajectory (e.g., without generating or using a visualization as described herein).

In some examples, the proposed path or trajectory analyzer 114 may run multiple tests on the same or different samples of the trajectory 502 using multiple safe arrival times generated under different assumption or conditions. For example, the proposed path or trajectory analyzer 114 may test that a proposed arrival time for a position complies with both the LSA and ESA for that position. This may be accomplished, for example, by testing a first visualization capturing LSAs (e.g., the visualization 402) and a second visualization capturing ESAs (e.g., the visualization 404). As another example, a single visualization that is tested may encode both LSAs and ESAs for at least some of the environment 126. In further examples, the safe arrival times or safe time intervals may be computed and used without employing a visualization. The proposed path or trajectory analyzer 114 may determine that the trajectory 502 is unsafe based at least in part on a proposed arrival time for a position failing to comply with a safe arrival time under either test, and may determine the trajectory 502 is safe based at least in part on the proposed arrival time for the position complying with a safe arrival time under each test. As further examples, a level or degree of safety for a trajectory and/or position may be based on multiple safe arrival times (e.g., both an LSA and ESA).

The proposed path or trajectory analyzer 114 may, in some examples, test relatively straight braking profiles. To do so both LSA and ESA may be tested. In additional examples, the proposed path or trajectory analyzer 114 may use both the LSA and ESA to perform a check of the path choice. For example, the LSA and ESA may be used to give a safest path from a current position. The proposed path or trajectory analyzer 114 may use the path or trajectory generator 116 to determine the safest path and/or trajectory and may compare a proposed path or trajectory to the safest path and/or trajectory (e.g., to determine a level or degree of safety for the path or trajectory as described above). To do so, the path or trajectory generator 116 may apply gradient ascent (or descent, given the multiplicative inverse of a visualization), and fit the curve into vehicle dynamics constraints. Gauss-Newton optimization may be faster than following the gradient, but the idea is the same. In some examples, multiple types of visualizations or approaches to computing safe arrival times need not be used to determine the safest path and/or trajectory.

In some embodiments, the proposed path or trajectory analyzer 114 comprises a machine learning model(s) used to analyze a proposed trajectory or path using one or more visualizations (e.g., any of the visualizations described here). The machine learning model may receive, for example, inputs comprising at least one visualization and at least one proposed trajectory or path. The machine learning model(s) may be trained to test the at least one proposed trajectory or path for safety using the at least one visualization. An output(s) of the machine learning model(s) may be representative of a safety level (alternatively referred to herein as a "level of safety" or "degree of safety") of a proposed trajectory or path (or portion or point thereof) provided as an input (e.g. corresponding to a binary value or degree of safety). The machine learning model(s) may comprise one or more neural networks (e.g., deep neural networks) that receive one or more of the inputs and generate one or more of the outputs. For example, the visualization(s) may be received by one or more convolutional neural networks. A visualization may include a proposed trajectory or path, or the proposed trajectory or path may be provided separate from a visualization to the machine learning model(s).

Figure 6A:
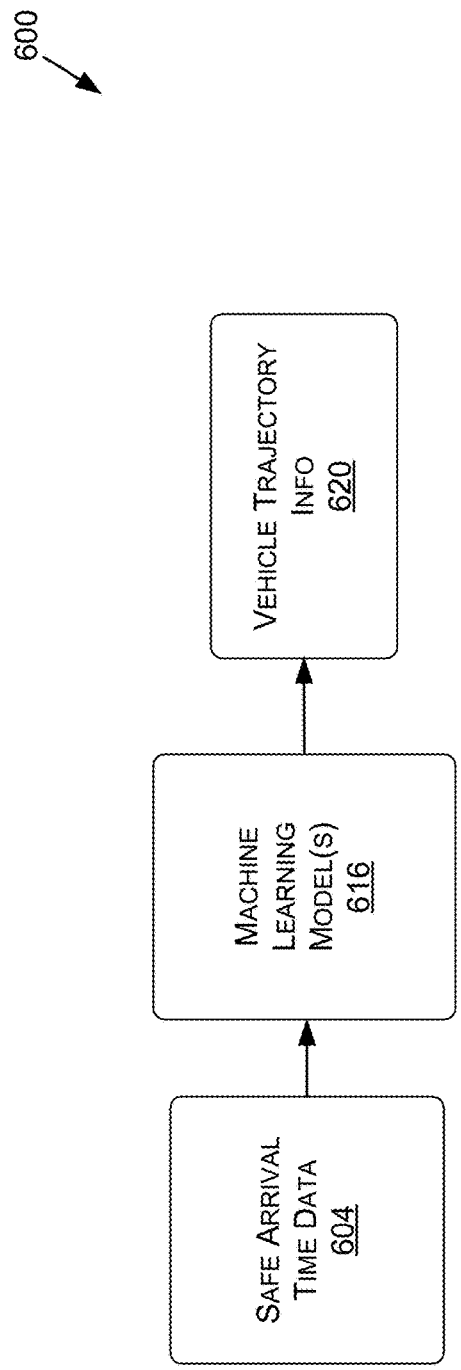
FIG. 6A is a data flow diagram illustrating an example process for generating a trajectory using safe arrival time data, in accordance with some embodiments of the present disclosure.

Now referring to FIG. 6A, FIG. 6A is a data flow diagram illustrating an example process 600 for generating a trajectory using safe arrival time data, in accordance with some embodiments of the present disclosure.

Any number of inputs, including but not limited to safe arrival time data 604, may be input into a machine learning model(s) 616. The safe arrival time data 604 may correspond to the safe arrival time data 120 of FIG. 1A.

The machine learning model(s) 616 may correspond to and/or be included as a feature or functionality of the path or trajectory generator 116, and may generate or compute any number of outputs, including but not limited to the vehicle trajectory information 620 (e.g., the vehicle trajectory information 124 of FIG. 1A). The vehicle trajectory information 620 may be transmitted or sent to a control component(s) of the autonomous vehicle 140, and may optionally be tested for safety using the proposed path or trajectory analyzer 114. The control component(s) may then use the vehicle trajectory information 620 (or information generated from the vehicle trajectory information 620) to control the vehicle 140 according to the vehicle trajectory information 620.

The safe arrival time data 604 input to the machine learning model(s) 616 may include any number of visualizations (e.g., images) described herein, or may represent one or more safe arrival times in a different manner. The safe arrival time data 604 may be generated, as described above, using sensor data, such as the sensor data 102. Other potential sensor information generated from sensor data from one or more of the sensors 138 may be applied to the machine learning model(s) 616. The sensor information may include sensor data from any of the sensors of the vehicle 140 (and/or other vehicles, in some examples). In some examples, the inputs include vehicle status information representative of the status of the vehicle 140, such as speed, velocity, acceleration, deceleration, orientation or pose, location or position (e.g., relative to the safe arrival time data 604) in the environment 126 and/or other status information. This data may be captured by and/or received from one or more of the sensors of the vehicle 140, such as one or more of the IMU sensor(s) 1266, speed sensor(s) 1244, steering sensor(s) 1240, vibration sensor(s) 1242, and/or one or more sensors of the brake sensor system 1246, propulsion system 1250, and/or steering system 1254. The status information (e.g., speed, orientation, etc.) may be valuable to the machine learning model(s) 616 in computing the vehicle trajectory information 620.

The machine learning model(s) 616 may include any type of machine learning model(s), such as machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

Figure 6B:
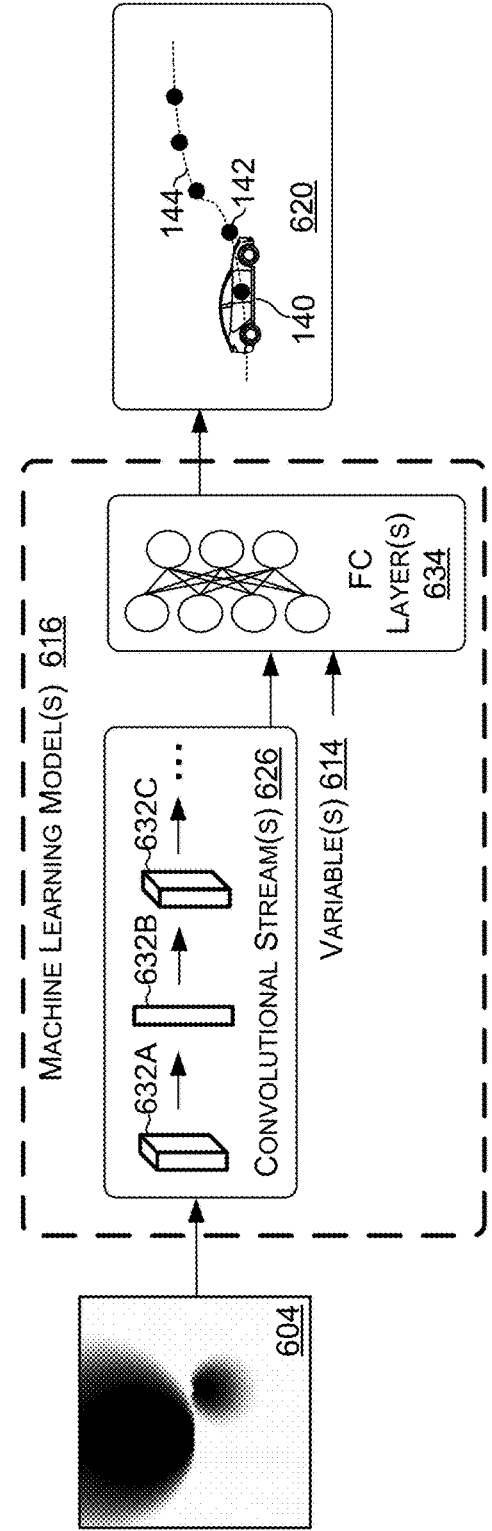
FIG. 6B is an illustration including an example machine learning model(s), in accordance with some embodiments of the present disclosure.

Now referring to FIG. 6B, FIG. 6B is an illustration including an example machine learning model(s) 616, in accordance with some embodiments of the present disclosure. The machine learning model(s) 616 of FIG. 6B may be one example of a machine learning model(s) that may be used in the process 600. However, the machine learning model(s) 616 of FIG. 6B is not intended to be limiting, and the machine learning model(s) 616 may include additional and/or different machine learning models than the machine learning model(s) of FIG. 6B. The machine learning model(s) 616 of FIG. 6B may include a convolutional neural network and thus may alternatively be referred to herein as convolutional neural network 616 or convolutional network 616.

The convolutional network 616 includes the safe arrival time data 604 representative of one or more visualizations of safe arrival times (e.g., LSA and/or ESA-based visualizations). In some example, the convolutional network 616 may also include other inputs, such as image data generated by one or more cameras (e.g., one or more of the cameras described herein with respect to FIGS. 12A-12C). The safe arrival time data 604 and potentially other image data may be input into convolutional stream(s) 626 of the convolutional network 616. For example, image data for each image may correspond to its own convolutional stream 626.

A convolutional stream 626 may include any number of layers, such as the layers 632A-632C. One or more of the layers may include an input layer. The input layer may hold values associated with the image data. For example, the input layer may hold values representative of the raw pixel values of the image(s) input to the convolutional network 616 as a volume (e.g., a width, a height, and color channels (e.g., RGB), such as 32×32×3).

One or more layers may include convolutional layers. The convolutional layers may compute the output of neurons that are connected to local regions in an input layer (e.g., the input layer), each computing a dot product between their weights and a small region they are connected to in the input volume. A result of the convolutional layers may be another volume, with one of the dimensions based at least in part on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 626 may include a fully connected layer, while in other examples, a fully connected layer 634 of the convolutional network 616 may be the fully connected layer for the convolutional stream(s) 626.

Although input layers, convolutional layers, pooling layers, ReLU layers, and fully connected layers are discussed herein with respect to the convolutional stream(s) 626, this is not intended to be limiting. For example, additional or alternative layers may be used in the convolutional stream(s) 626, such as normalization layers, SoftMax layers, and/or other layer types. Further, the order and number of layers of the convolutional network 616 and/or the convolutional stream 626 is not limited to any one architecture.

In addition, some of the layers may include parameters (e.g., weights), such as the convolutional layers and the fully connected layers, while others may not, such as the ReLU layers and pooling layers. In some examples, the parameters may be learned by the convolutional stream 626 and/or the fully connected layer(s) 634 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited, and may differ depending on the embodiment.

The output of the convolutional stream(s) 626 may be input to the fully connected layer(s) 634 of the convolutional network 616. In addition to the output of the convolutional stream(s) 626, variable(s) 614, at least some of which may be representative of the vehicle status information and/or one or more parameters for one or more objects provided by the object analyzer 106, may be input to the fully connected layer(s) 634.

The machine learning model(s) 616 may be trained using example trajectories for given inputs to the machine learning model 616. In some examples, the example trajectories may be captured from actual trajectories of a vehicle(s) driven by human and/or autonomous drivers and extracted from sensor data generated by a sensor(s) of the vehicle(s). Similarly, the inputs for example trajectories may be extracted from sensor data generated by a sensor(s) of the vehicle(s). For example, a visualization for the safe arrival time data 604 may be generated using approaches described herein and used as training data for an example trajectory. In some examples, the training data may correspond to a virtual vehicle, such as a vehicle driven in a virtual simulation comprising a virtual environment.

Figure 7:
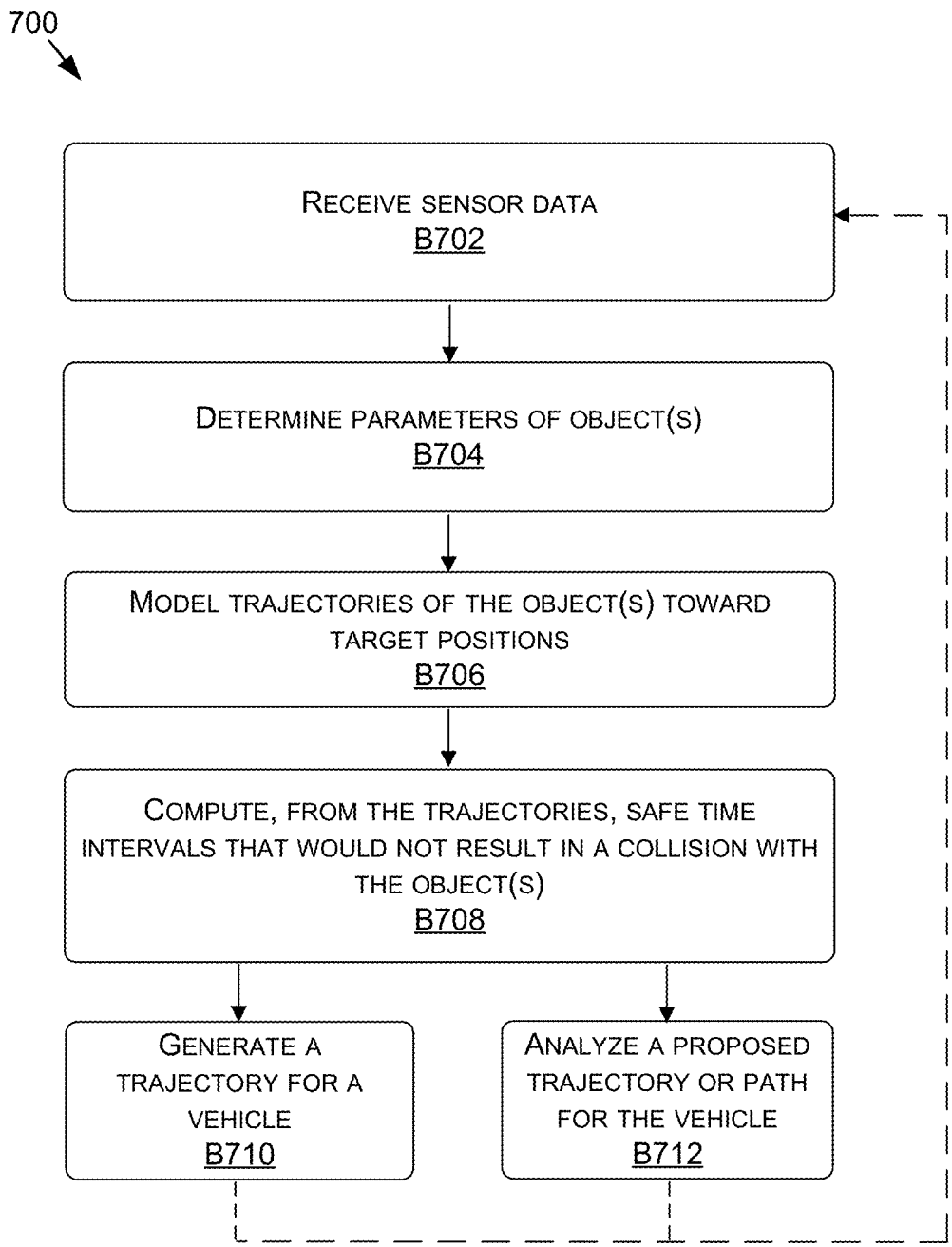
FIG. 7 is a flow diagram showing a method for controlling autonomous vehicles using safe arrival times, in accordance with some embodiments of the present disclosure.

Now referring to FIG. 7, FIG. 7 is a flow diagram showing a method 700 for controlling vehicles using safe arrival times, in accordance with some embodiments of the present disclosure. Each block of the method 700, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. Methods described herein may additionally or alternatively be executed by any one system, or any combination of systems, including, but not limited to, those described herein and are not limited to particular examples.

The method 700, at block B702, includes receiving sensor data. For example, the communications manager 104 may receive the sensor data 102 from at least one sensor of the vehicle 140.

The method 700, at block B704, includes determining parameters of object(s). For example, the object analyzer 106 may determine, based at least in part on the sensor data 102, parameters of the object 128A located in the environment 126 and, in some examples, at least one other object, such as the object 128B and the object 128C.

The method 700, at block B706, includes modeling trajectories of the object(s) toward target positions. For example, the object modeler 108 may model trajectories of the object 128A toward each of the target positions $P_1$, $P_2$, $P_3$, $P_4$, $P_5$, $P_6$, and $P_7$ of FIG. 3B based at least in part on the parameters of the object 128A. The object modeler 108 may in some examples also model trajectories of the object 128B toward each of the target positions $P_1$, $P_2$, $P_3$, $P_4$, $P_5$, $P_6$, and $P_7$ of FIG. 3B based at least in part on the parameters of the object 128B, and model trajectories of the object 128C toward each of the target positions $P_1$, $P_2$, $P_3$, $P_4$, $P_5$, $P_6$, and $P_7$ of FIG. 3B based at least in part on the parameters of the object 128C.

In some examples, the object 128A may correspond to object $Y_1$ of FIG. 3B, and a trajectory 320 may correspond to one of the trajectories modeled for the object 128A. Also, the object 128B may correspond to object $Y_2$ of FIG. 3B, and a trajectory 322 may correspond to one of the trajectories modeled for the object 128B. Further, the object 128C may correspond to object $Y_3$ of FIG. 3B, and a trajectory 324 may correspond to one of the trajectories modeled for the object 128C.

The method 700, at block B708, includes computing, from the trajectories, safe time intervals that would not result in a collision with the object(s). For example, the object trajectory analyzer 110 may compute, from the trajectories, safe time intervals over which the vehicle 140 occupying the target positions $P_1$, $P_2$, $P_3$, $P_4$, $P_5$, $P_6$, and $P_7$ would not result in a collision with at least the object 128A. For example, the object trajectory analyzer 110 may analyze the trajectory 320, which may correspond to the motion profile that corresponds to the chart 200 of FIG. 2. If the end time $T_E$ of the trajectory 320 is a safe arrival time for the vehicle 140 (e.g., the object trajectory analyzer 110 determines the object 128A is at a complete stop), the object trajectory analyzer 110 may use the end time $T_S$ of the trajectory 320 as an end time of a safe time interval and the start time $T_S$ of the trajectory 320 as a start time of the safe time interval (In other examples any range of time within the trajectory may be computed as a safe time interval). The object trajectory analyzer 110 may similarly compute safe arrival times for other modeled trajectories of the object $Y_1$ to the target positions $P_2, P_3, P_4, P_5, P_6$, and $P_7$. In examples that consider multiple objects, safe arrival times may similarly be computed for the object $Y_2$ and each of the target positions $P_2, P_3, P_4, P_5, P_6$, and $P_7$, and the object $Y_3$ and each of the target positions $P_2, P_3, P_4, P_5, P_6$, and $P_7$.

The method 700, at block B710, includes generating a trajectory for a vehicle. For example, based at least in part on the safe time intervals and a position of the vehicle 140 in the environment 126, the path or trajectory generator 116 may generate the vehicle trajectory information 124 representative of at least a portion of the trajectory 144 for the vehicle 140.

The method 700, at block B712, includes analyzing a proposed trajectory or path for a vehicle. For example, based at least in part on the safe time intervals and a position of the vehicle 140 in the environment 126, the proposed path or trajectory analyzer 114 may analyze the vehicle trajectory information 124 representative of at least a portion of the trajectory 144 for the vehicle 140.

In some examples, the method 700 may include only one of block B710 and block B712. Further, a trajectory generated at block B710 may be analyzed at block B712.

Figure 8:
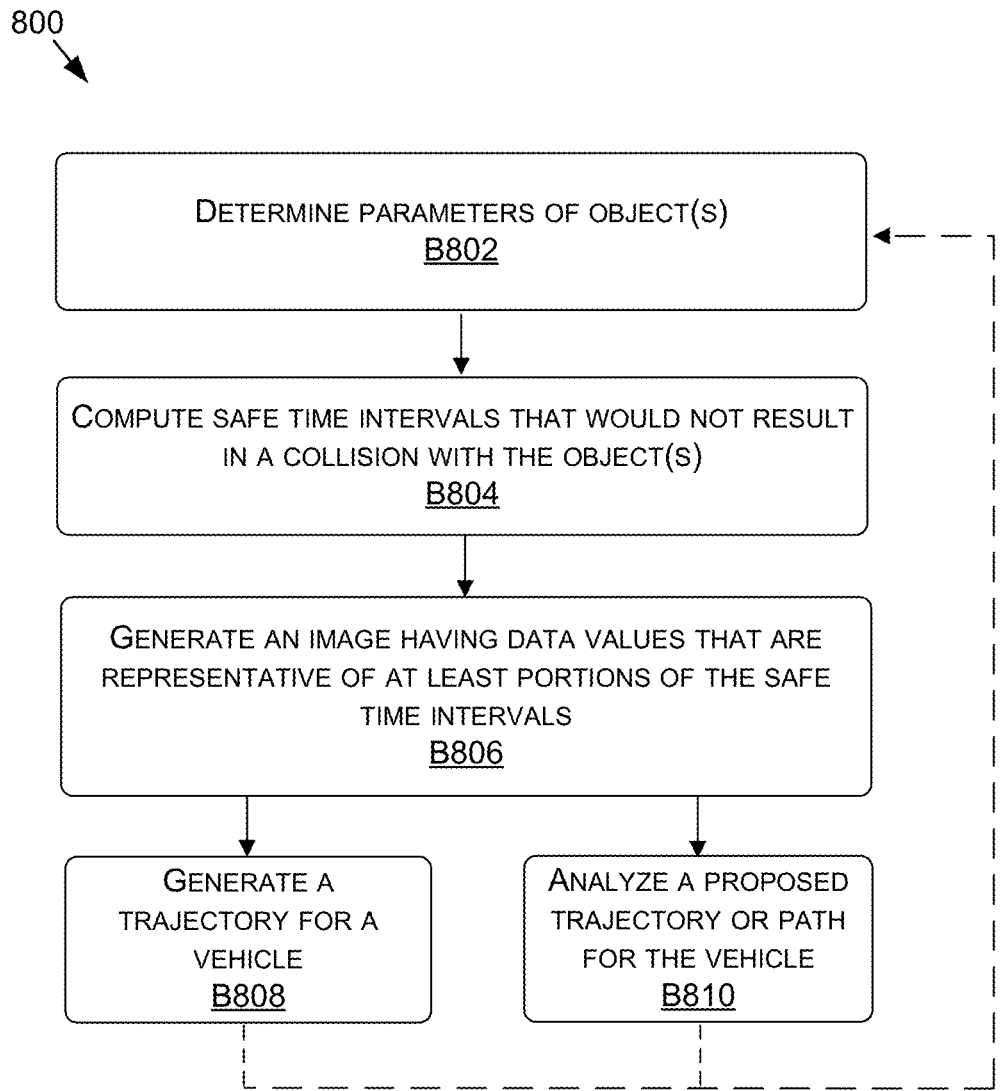
FIG. 8 is a flow diagram showing a method for controlling autonomous vehicles using safe arrival times, in accordance with some embodiments of the present disclosure.

FIG. 8 is a flow diagram showing a method 800 for controlling vehicles using safe arrival times, in accordance with some embodiments of the present disclosure. Each block of the method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few.

The method 800, at block B802, includes determining parameters of object(s). For example, the object analyzer 106 may determine, based at least in part on the sensor data 102, parameters of the object 128A located in the environment 126 and in some examples at least one other object, such as the object 128B and the object 128C. In some examples, the object analyzer 106 receives one or more of the parameters from another vehicle or system, such as using the communications manager 104.

The method 800, at block B804, includes computing safe time intervals that would not result in a collision with the object(s). For example, the object modeler 108 may model trajectories of the object 128A, and in some examples at least one of the object 128B or the object 128C, and the object trajectory analyzer 110 may compute, from trajectories associated the object 128A, the object 128B, or the object 128C, safe time intervals over which the vehicle 140 occupying the target positions $P_1, P_2, P_3, P_4, P_5, P_6$, and $P_7$ would not result in a collision with the object 128A, the object 128B, or the object 128C, based at least in part on the one or more parameters.

The method 800, at block B806, includes generating an image having data values that are representative of at least portions of the safe time intervals. For example, the visualization generator 112 may generate an image having data values that are representative of at least portions of the safe time intervals. In examples that use the safe time intervals associated with the object 128A and the object 128B, the image may be similar to what is shown for the safe arrival time data 120 in FIG. 1A. As other examples, the image may appear similar to the visualization 402 of FIG. 4A or the visualization 404 of FIG. 4B.

The method 800, at block B808, includes generating a trajectory for a vehicle. For example, based at least in part on the image, and a position of the vehicle 140 in the environment 126, the path or trajectory generator 116 may generate the vehicle trajectory information 124 representative of at least a portion of the trajectory 144 for the vehicle 140.

The method 800, at block B810, includes analyzing a proposed trajectory or path for a vehicle. For example, based at least in part on the image and a position of the vehicle 140 in the environment 126, the proposed path or trajectory analyzer 114 may analyze the vehicle trajectory information 124 representative of at least a portion of the trajectory 144 for the vehicle 140.

In some examples, the method 800 may include only one of block B808 and block B810. Further, a trajectory generated at block B808 may be analyzed at block B810.

Figure 9:
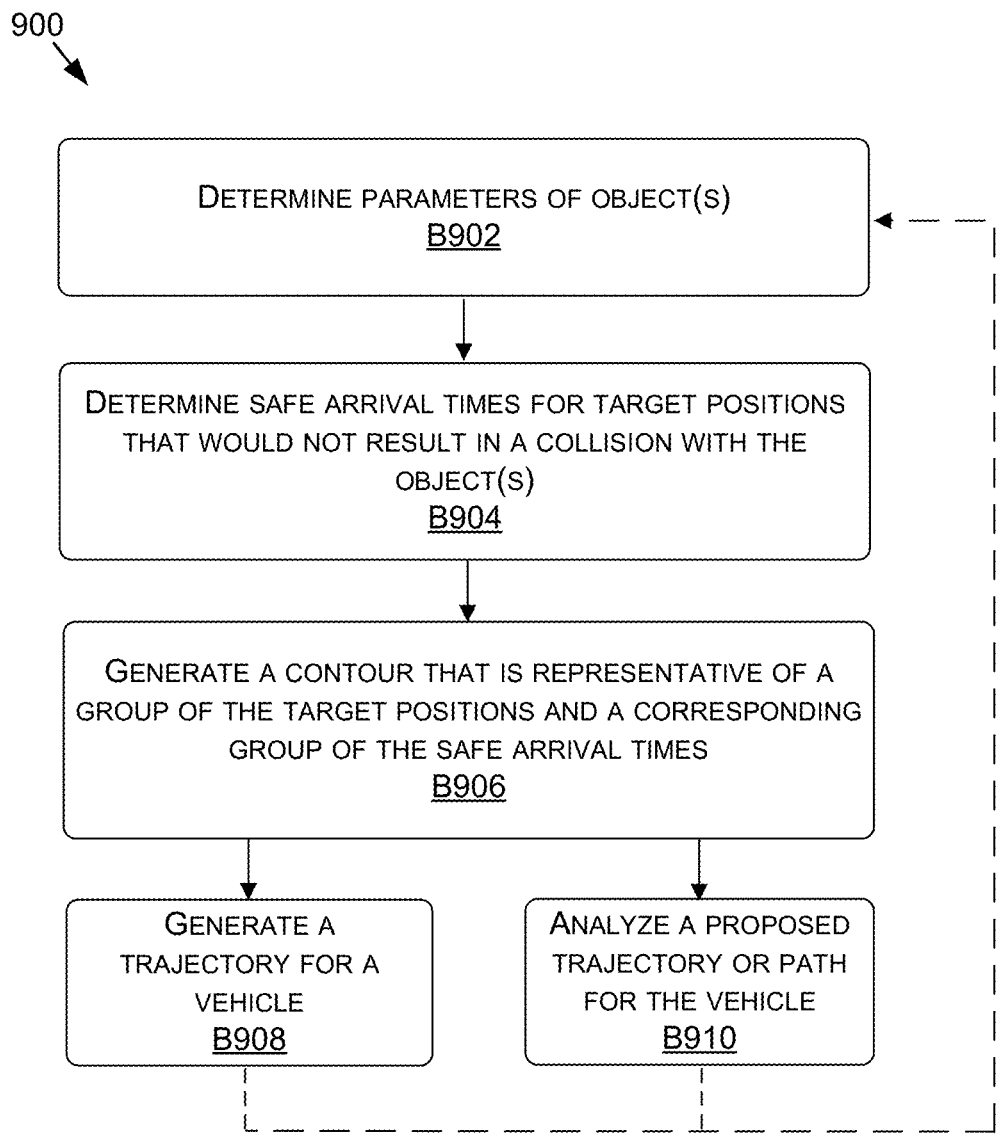
FIG. 9 is a flow diagram showing a method for controlling autonomous vehicles using safe arrival times, in accordance with some embodiments of the present disclosure.

Now referring to FIG. 9, FIG. 9 is a flow diagram showing a method 900 for controlling vehicles using safe arrival times, in accordance with some embodiments of the present disclosure. Each block of the method 900, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few.

The method 900, at block B902, includes determining parameters of object(s). For example, the object analyzer 106 may determine, based at least in part on the sensor data 102, parameters of the object 128A located in the environment 126 and in some examples at least one other object, such as the object 128B and the object 128C.

The method 900, at block B904, includes determining safe arrival times for target positions that would not result in a collision with the object(s). For example, the object trajectory analyzer 110 may determine, based at least in part on the parameters of the object 128A, the object 128B, and/or the object 128C, safe arrival times at which the vehicle 140 occupying the target positions $P_1, P_2, P_3$ of FIG. 3B and/or other points in the environment that correspond to the contour 308 would not result in a collision with the object 128A, the object 128B, and/or the object 128C.

The method 900, at block B906, includes generating a contour that is representative of a group of the target positions and a corresponding group of the safe arrival times. For example, the visualization generator 112 may generate the contour 308 forming at least a portion of a graphical representation of the environment 126. The contour 308 may be included in any suitable visualization described herein and may be represented in the safe arrival time data 120 in any suitable form, such as image form (e.g., rasterized or vector) and/or mathematical form.

The method 900, at block B908, includes generating a trajectory for a vehicle. For example, based at least in part on the contour, and a position of the vehicle 140 in the environment 126, the path or trajectory generator 116 may generate the vehicle trajectory information 124 representative of at least a portion of the trajectory 144 for the vehicle 140.

The method 900, at block B910, includes analyzing a proposed trajectory or path for a vehicle. For example, based at least in part on the contour and a position of the vehicle 140 in the environment 126, the proposed path or trajectory analyzer 114 may analyze the vehicle trajectory information 124 representative of at least a portion of the trajectory 144 for the vehicle 140.

In some examples, the method 900 may include only one of block B908 and block B910. Further, a trajectory generated at block B908 may be analyzed at block B910.

Figure 10:
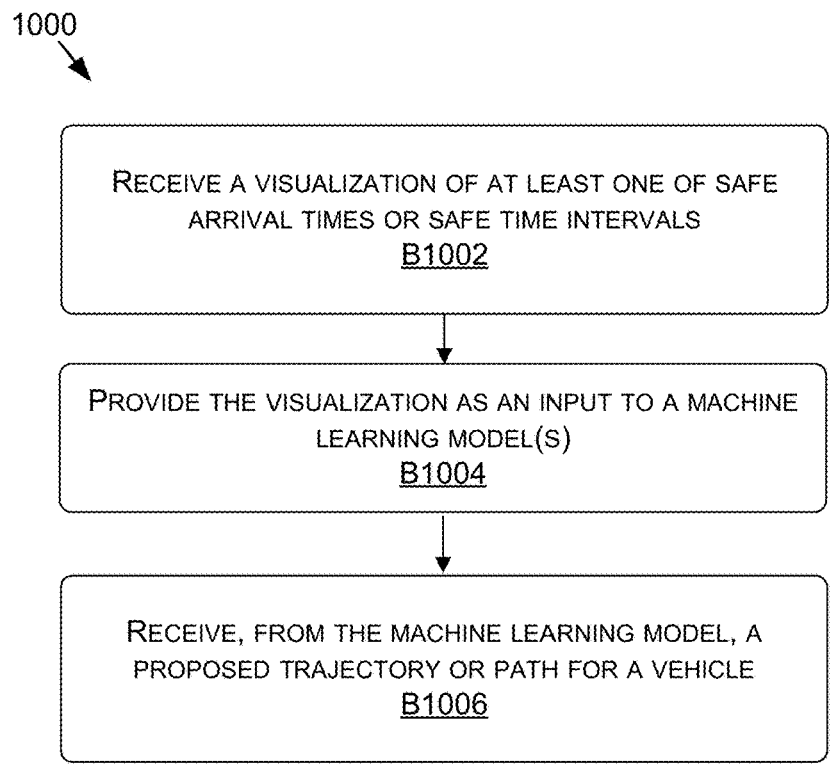
FIG. 10 is a flow diagram showing a method for controlling autonomous vehicles using safe arrival times, in accordance with some embodiments of the present disclosure.

Now referring to FIG. 10, FIG. 10 is a flow diagram showing a method 1000 for controlling vehicles using safe arrival times, in accordance with some embodiments of the present disclosure. Each block of the method 1000, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few.

The method 1000, at block B1002, includes receiving a visualization of at least one or safe arrival times or safe time intervals. For example, the path or trajectory generator 116 may receive the safe arrival time data 604 of FIG. 6A from the visualization generator 112.

The method 1000, at block B1004, includes providing the visualization as an input to a machine learning model(s). For example, the path or trajectory generator 116 may provide the safe arrival time data 604 as an input to the machine learning model(s) 616.

The method 1000, at block B1006, includes receiving, from the machine learning model(s), a proposed trajectory or path for a vehicle. For example, the visualization generator 112 may receive, from the machine learning model(s) 616, the vehicle trajectory information 620.

Figure 11:
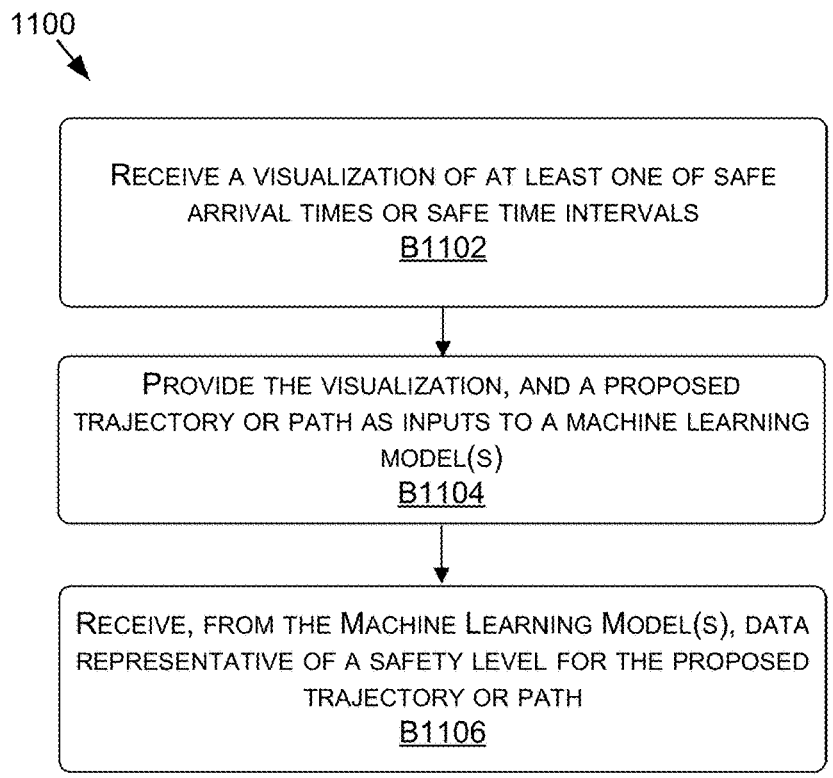
FIG. 11 is a flow diagram showing a method for controlling autonomous vehicles using safe arrival times, in accordance with some embodiments of the present disclosure.

Now referring to FIG. 11, FIG. 11 is a flow diagram showing a method 1100 for controlling vehicles using safe arrival times, in accordance with some embodiments of the present disclosure. Each block of the method 1100, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few.

The method 1100, at block B1102, includes receiving a visualization of at least one or safe arrival times or safe time intervals. For example, the proposed path or trajectory analyzer 114 may receive the safe arrival time data 120 from the visualization generator 112.

The method 1100, at block B1104, includes providing the visualization and a proposed trajectory or path as inputs to a machine learning model(s). For example, the proposed path or trajectory analyzer 114 may provide the safe arrival time data 604 and the vehicle trajectory information 124 as inputs to the machine learning model(s).

The method 1100, at block B1106, includes receiving, from the machine learning model(s), data representative of a safety level for the proposed trajectory or path. For example, the proposed path or trajectory analyzer 114 may receive, from the machine learning model(s), a level of safety for the proposed trajectory or path, such as a degree of safety.

Example Autonomous Vehicle

FIG. 12A is an illustration of an example autonomous vehicle 1200, in accordance with some embodiments of the present disclosure. The autonomous vehicle 1200 (alternatively referred to herein as the "vehicle 1200") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3-Level 5 of the autonomous driving levels. For example, the vehicle 1200 may be capable of conditional automation (Level 3), high automation (Level 4), and/or full automation (Level 5), depending on the embodiment.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/ or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the HD map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1224 which may use one or more wireless antenna(s) 1226 and/or modem(s) to communicate over one or more networks. For example, the network interface 1224 may be capable of communication over LTE, WCDMA, UMTS, GSM, CDMA2000, etc. The wireless antenna(s) 1226 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 1220 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may any number of wide-view cameras 1270 on the vehicle 1200. In addition, long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

One or more stereo cameras 1268 may also be included in a front-facing configuration. The stereo camera(s) 1268 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster can be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 612508 standards, although other standards and protocols may be used.

In some examples, the SoC(s) 1204 may include a real-time ray-tracing hardware accelerator, such as described in U.S. patent application Ser. No. 16/101,1232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based at least in part on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS and/or assisted GPS sensors), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 1220-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe)

laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based at least in part on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, WiFi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based at least in part on training performed at a datacenter (e.g., using the server(s) 1278 and/or other servers).

The server(s) 1278 may be used to train machine learning models (e.g., neural networks) based at least in part on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

FIG. 13 is a block diagram of an example computing device 1300 suitable for use in implementing some embodiments of the present disclosure. Computing device 1300 may include a bus 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, and one or more presentation components 1318 (e.g., display(s)).

Although the various blocks of FIG. 13 are shown as connected via the bus 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console,"

"electronic control unit (ECU)," "virtual reality system," and/or other device or system types, as all are contemplated within the scope of the computing device of FIG. 13.

The bus 1302 may represent one or more busses, such as an address bus, a data bus, a control bus, or a combination thereof. The bus 1302 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an ARM processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

The GPU(s) 1308 may be used by the computing device 1300 to render graphics (e.g., 3D graphics). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data. The display memory may be included as part of the memory 1304. The GPU(s) 1308 may include two or more GPUs operating in parallel (e.g., via a link). When combined together, each GPU 1308 may generate pixel data for different portions of an output image or for different output images (e.g., a first GPU for a first image and a second GPU for a second image). Each GPU may include its own memory, or may share memory with other GPUs.

In examples where the computing device 1300 does not include the GPU(s) 1308, the CPU(s) 1306 may be used to render graphics.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof.

The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   selecting at least two target positions in an environment based at least on a location of a machine in the environment;
   based at least on the selecting, generating at least two paths for an object based at least on directing the at least two paths from a location of the object through to the at least two target positions;
   based at least on the generating, simulating the object traversing the at least two paths to compute at least two arrival times of the object to the at least two target positions;
   sampling an arrival time of the machine to a position in a proposed trajectory for the machine;
   comparing the position in the proposed trajectory to the at least two target positions using the arrival time of the machine to the position and the at least two arrival times of the object to the at least two target positions;
   based at least on the comparing, determining whether the machine, when traversing the proposed trajectory, will arrive at the at least two target positions prior to the at least two arrival times; and
   performing one or more control operations for the machine based at least on the determining whether the machine will arrive at the at least two target positions prior to the at least two arrival times.

2. The method of claim 1, wherein the determining whether the machine will arrive at the at least two target positions prior to the at least two arrival times is based at least on:
   determining a shape corresponding to the machine at the position of the proposed trajectory;
   identifying the at least two target positions based at least on spatial proximity of the at least two target positions to the shape corresponding to the machine; and
   selecting the at least two arrival times for the comparing based at least on the identifying of the at least two target positions.

3. The method of claim 1, wherein the directing includes controlling the at least two paths of the object using one or more predetermined scenarios.

4. The method of claim 1, wherein the determining whether the machine will arrive at the at least two target positions prior to the at least two arrival times is based at least on:
   testing an intersection of a shape representing the machine at the position of the proposed trajectory with a plurality of target positions in the environment;
   selecting the at least two target positions from the plurality of target positions based at least on the testing; and
   comparing the arrival time of the machine to the position in the proposed trajectory to the at least two arrival times of the object based at least on the selecting of the at least two target positions.

5. The method of claim 1, wherein the simulating includes applying one or more predetermined motion profiles to the at least two paths, the one or more predetermined motion profiles defining motion of the object over time.

6. The method of claim 1, wherein the comparing includes:
   determining, using a first arrival time of the at least two arrival times, a first duration indicating a first time window that no collision would occur between the object and the machine at a first target position of the at least two target positions;
   determining, using a second arrival time of the at least two arrival times, a second duration indicating a second time window that no collision would occur between the object and the machine at a second target position of the at least two target positions; and
   determining whether the arrival time is within the first duration and the second duration.

7. The method of claim 1, wherein the comparing the position in the proposed trajectory to the at least two target positions is based at least on identifying the at least two target positions in an image representing the environment, the image including data values corresponding to the at least two arrival times, and wherein the comparing uses the data values from the image.

8. The method of claim 1, wherein the machine includes an autonomous or semi-autonomous machine.

9. A system comprising:
one or more processing units to execute operations comprising:
selecting at least two target positions in an environment based at least on a location of a machine in the environment;
based at least on the selecting, generating at least two paths for an object in the environment, at least in part, by directing the at least two paths from a location of the object through to the at least two target positions;
based at least on the generating, simulating the object traversing the at least two paths to compute at least two arrival times of the object to the at least two target positions;
selecting, using a position in a proposed trajectory for the machine, a subset of the at least two target positions based at least on spatial proximity of the subset to the position, the subset corresponding to one or more arrival times of the at least two arrival times;
based at least on the selecting, determining, using the one or more arrival times and an arrival time of the machine to the position in the proposed trajectory, whether the machine, when traversing the proposed trajectory, will collide with the object; and
performing one or more control operations for the machine based at least on the determining whether the machine will collide with the object.

10. The system of claim 9, wherein the determining whether the machine will collide with the object is based at least on:
determining a shape corresponding to the machine at the position of the proposed trajectory;
identifying the subset of the at least two target positions using the shape corresponding to the machine; and
selecting the one or more arrival times for the determining based at least on the identifying of the subset of the at least two target positions.

11. The system of claim 10, wherein the shape represents a leading edge of the machine.

12. The system of claim 9, wherein the determining whether the machine will collide with the object is based at least on:
intersection testing a shape representing the machine at the position of the proposed trajectory with the at least two target positions in the environment;
selecting the subset of the at least two target positions from the at least two target positions based at least on the intersection testing; and
comparing the arrival time of the machine to the one or more arrival times of the object based at least on the selecting of the subset of the at least two target positions.

13. The system of claim 9, wherein the simulating is of a predetermined scenario in which for each of the at least two target positions the object comes to a stop at the at least two target positions.

14. The system of claim 9, wherein the determining whether the machine will collide with the object is based at least on identifying the subset of the at least two target positions in an image representing the environment, the image including data values corresponding to the at least two arrival times, and wherein the determining uses a subset of the data values from the image.

15. At least one processor comprising:
one or more circuits to perform one or more control operations for a machine based at least on evaluating a proposed trajectory for the machine in an environment using an arrival time of the machine to a position in the proposed trajectory and at least two arrival times of an object to at least two target positions in the environment, the at least two arrival times determined based at least on:
selecting the at least two target positions in the environment based at least on a location of the machine in the environment;
based at least on the selecting, generating at least two paths for the object in the environment, at least in part, by directing the at least two paths from a location of the object through to the at least two target positions; and
based at least on the generating, simulating the object traversing the at least two paths to compute the at least two arrival times of the object to the at least two target positions.

16. The at least one processor of claim 15, wherein the one or more circuits are to:
identify the at least two target positions using a shape corresponding to the machine at the position of the proposed trajectory; and
select the at least two arrival times for the evaluating based at least on the identifying of the at least two target positions.

17. The at least one processor of claim 16, wherein the shape represents a leading edge of the machine.

18. The at least one processor of claim 15, wherein the one or more circuits are to:
intersection test a shape representing the machine at the position of the proposed trajectory with a plurality of target positions in the environment;
select the at least two target positions from the plurality of target positions based at least on the intersection testing; and
compare the arrival time of the machine to the at least two arrival times of the object based at least on the selecting of the at least two target positions.

19. The at least one processor of claim 15, wherein the simulating is of a predetermined scenario in which for each of the at least two target positions the object comes to a stop at the at least two target positions.

20. The at least one processor of claim 15, wherein the at least one processor is comprised in at least one of:
a control system for an autonomous or semi-autonomous machine;
a perception system for an autonomous or semi-autonomous machine;
a system for performing simulation operations;
a system for performing light transport simulation;
a system for performing deep learning operations;
a system implemented using a machine; or
a system implemented at least partially using cloud computing resources.

* * * * *